(12) United States Patent
Maruo et al.

(10) Patent No.: US 10,578,010 B2
(45) Date of Patent: Mar. 3, 2020

(54) CONTROL DEVICE FOR AN INTERNAL COMBUSTION ENGINE

(71) Applicant: Mitsubishi Electric Corporation, Tokyo (JP)

(72) Inventors: Toshiaki Maruo, Hyogo (JP); Yuji Kubota, Tokyo (JP); Takahiko Ono, Hyogo (JP)

(73) Assignee: Mitsubishi Electric Corporation, Tokyo (JP)

( * ) Notice: Subject to any disclaimer, the term of this patent is extended or adjusted under 35 U.S.C. 154(b) by 102 days.

(21) Appl. No.: 15/873,042

(22) Filed: Jan. 17, 2018

(65) Prior Publication Data

US 2019/0024575 A1 Jan. 24, 2019

(30) Foreign Application Priority Data

Jul. 19, 2017 (JP) ................................. 2017-139749

(51) Int. Cl.
| | |
|---|---|
| *F02B 37/18* | (2006.01) |
| *F02B 39/16* | (2006.01) |
| *F02D 23/02* | (2006.01) |
| *F02D 41/00* | (2006.01) |

(Continued)

(52) U.S. Cl.
CPC ............ *F02B 37/186* (2013.01); *F02B 39/16* (2013.01); *F02D 23/02* (2013.01); *F02D 41/0007* (2013.01); *F02B 37/225* (2013.01); *F02B 2039/166* (2013.01); *F02B 2039/168* (2013.01);

(Continued)

(58) Field of Classification Search
CPC ...... F02B 39/16; F02B 37/186; F02B 37/225; F02B 2039/166; F02B 2039/168; F02D 23/02; F02D 41/0007; F02D 41/182; F02D 41/18; F02D 2200/0402; F02D 2200/0406; F02D 2200/1414; Y02T 10/144
See application file for complete search history.

(56) References Cited

U.S. PATENT DOCUMENTS

| | | | | |
|---|---|---|---|---|
| 8,919,120 | B2 * | 12/2014 | Robinson | ................ F02B 29/04 477/32 |
| 2003/0177766 | A1 * | 9/2003 | Wang | .................... F02D 41/145 60/602 |
| 2013/0042609 | A1 * | 2/2013 | Cianflone | ........... F02D 41/0062 60/602 |

FOREIGN PATENT DOCUMENTS

| | | |
|---|---|---|
| JP | 5420013 B2 | 2/2014 |
| JP | 5853403 B2 | 2/2016 |

* cited by examiner

*Primary Examiner* — Patrick D Maines
*Assistant Examiner* — Dapinder Singh
(74) *Attorney, Agent, or Firm* — Sughrue Mion, PLLC; Richard C. Turner

(57) ABSTRACT

In a control device for an internal combustion engine, when a target pre/post compressor pressure ratio calculated by a target pre/post compressor pressure ratio calculation part is more than a turbine-limit-time pre/post compressor pressure ratio calculated by a turbine-limit-time pre/post compressor pressure ratio calculation part, an upper limit of the target pre/post compressor pressure ratio is limited by the turbine-limit-time pre/post compressor pressure ratio, and a change rate of the target pre/post compressor pressure ratio is limited by a change rate limit value during a change rate limitation period after upper limit limitation processing starts, thereby preventing the target pre/post compressor pressure ratio from being suddenly fluctuated by a sudden fluctuation in a compressor passage flow rate, and suppressing the occurrence of the over rotation of the turbine and the control hunting.

20 Claims, 11 Drawing Sheets

(51) Int. Cl.
*F02D 41/18* (2006.01)
*F02B 37/22* (2006.01)

(52) U.S. Cl.
CPC .... *F02D 41/182* (2013.01); *F02D 2200/0406* (2013.01); *F02D 2200/0414* (2013.01)

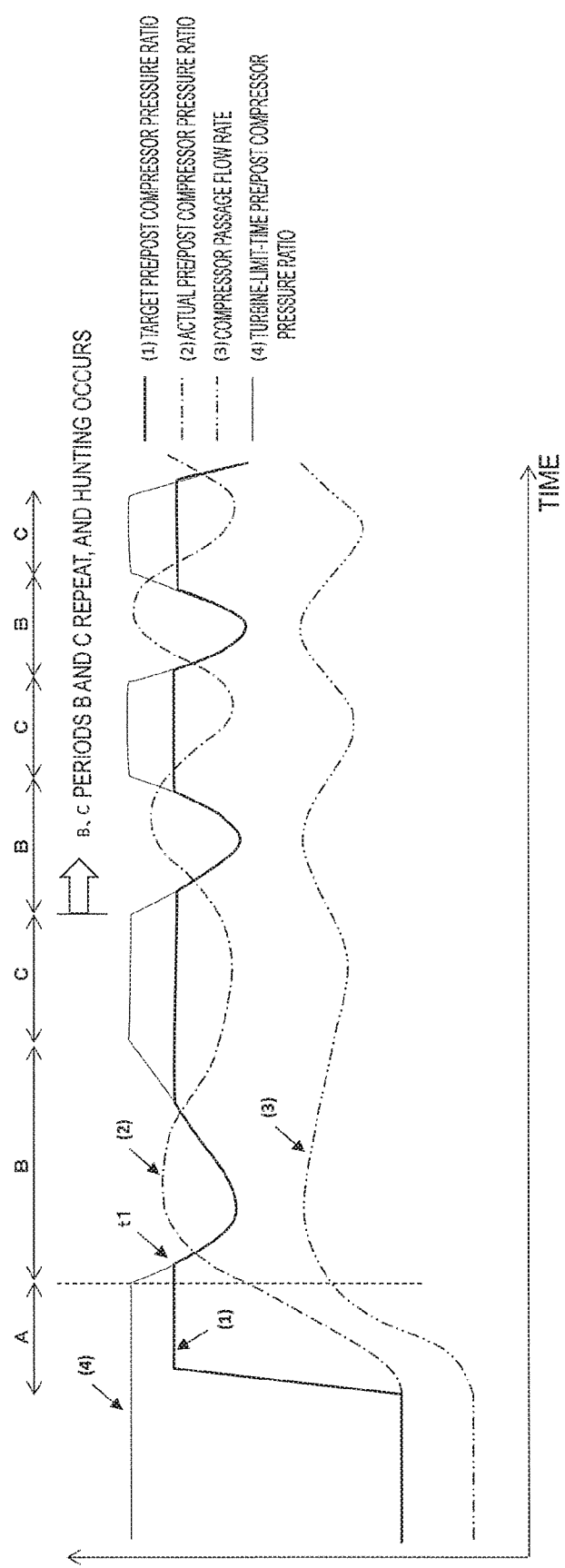

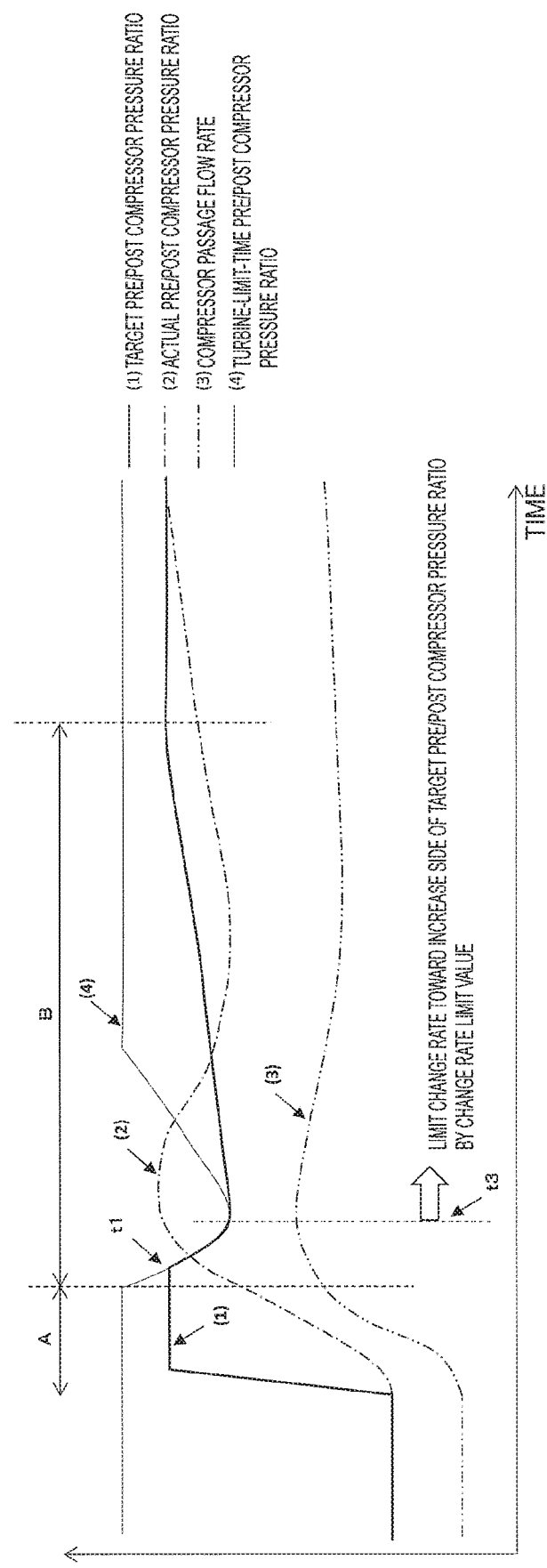

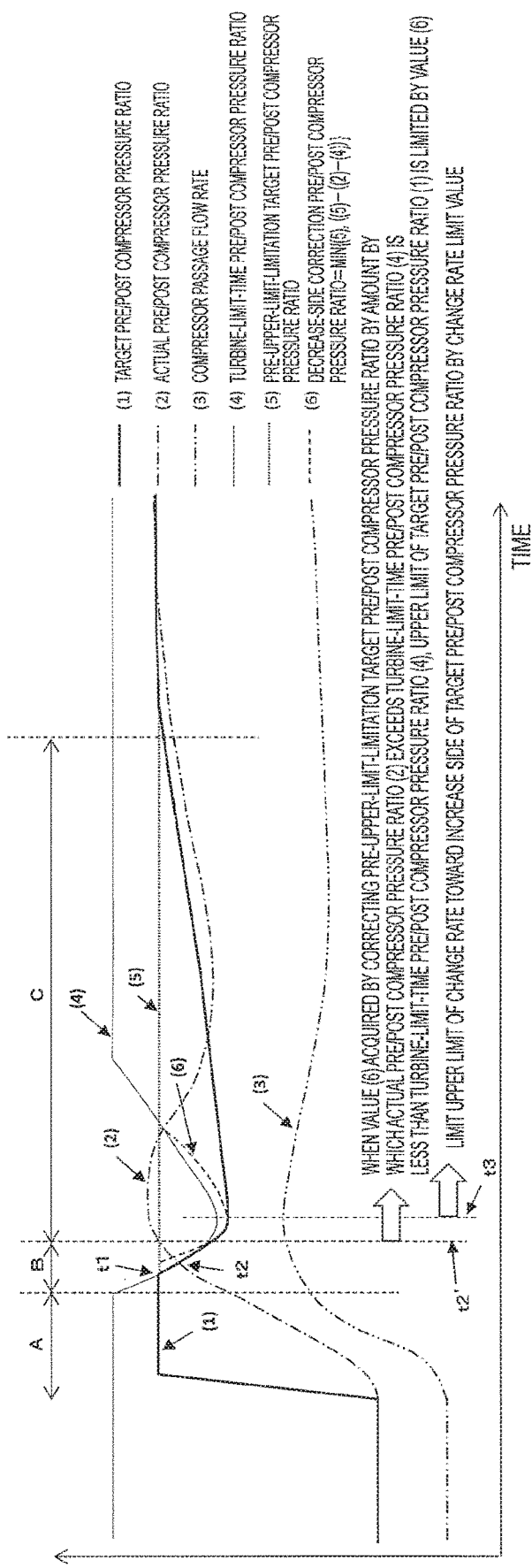

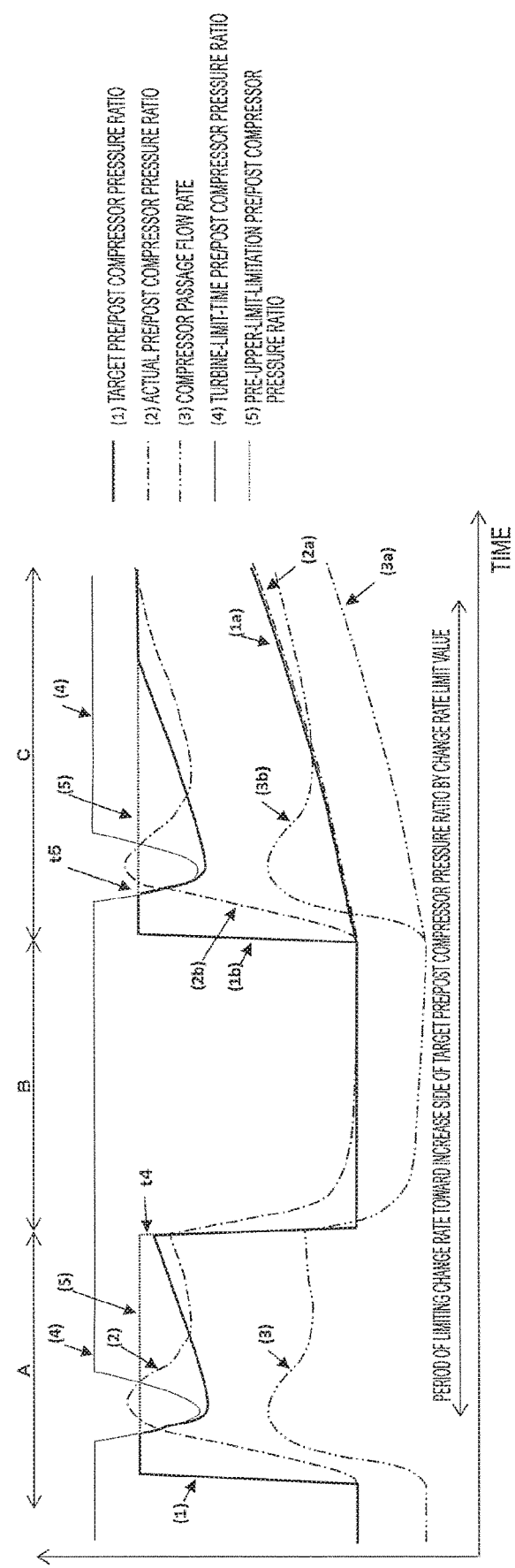

FIG. 6

TARGET THROTTLE UPSTREAM PRESSURE MAP [UNIT:kPa]

| ACCELERATOR OPENING DEGREE [%] | NUMBER OF REVOLUTIONS OF ENGINE [r/min] | | | | | |
|---|---|---|---|---|---|---|
| | 1000 | 2000 | 3000 | 4000 | 5000 | 6000 |
| 10 | 100 | 100 | 100 | 100 | 100 | 100 |
| 20 | 100 | 100 | 100 | 100 | 120 | 120 |
| 30 | 100 | 100 | 100 | 100 | 120 | 140 |
| 40 | 120 | 120 | 120 | 120 | 140 | 180 |
| 50 | 120 | 140 | 140 | 120 | 160 | 180 |
| 60 | 120 | 140 | 140 | 140 | 160 | 200 |
| 70 | 120 | 160 | 180 | 180 | 200 | 200 |
| 80 | 120 | 160 | 180 | 180 | 220 | 200 |
| 90 | 140 | 180 | 200 | 200 | 220 | 240 |
| 100 | 140 | 200 | 220 | 220 | 240 | 240 |

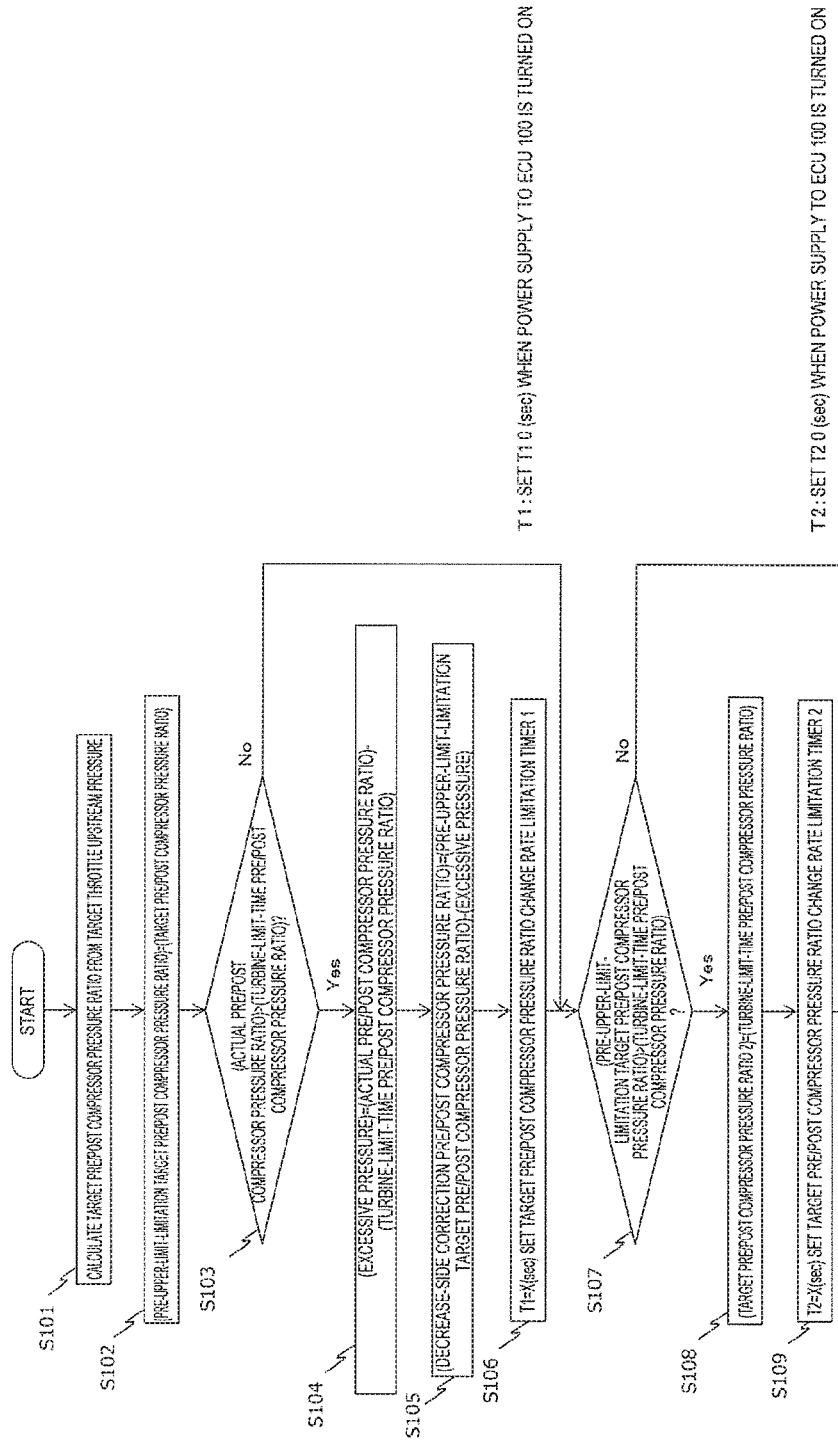

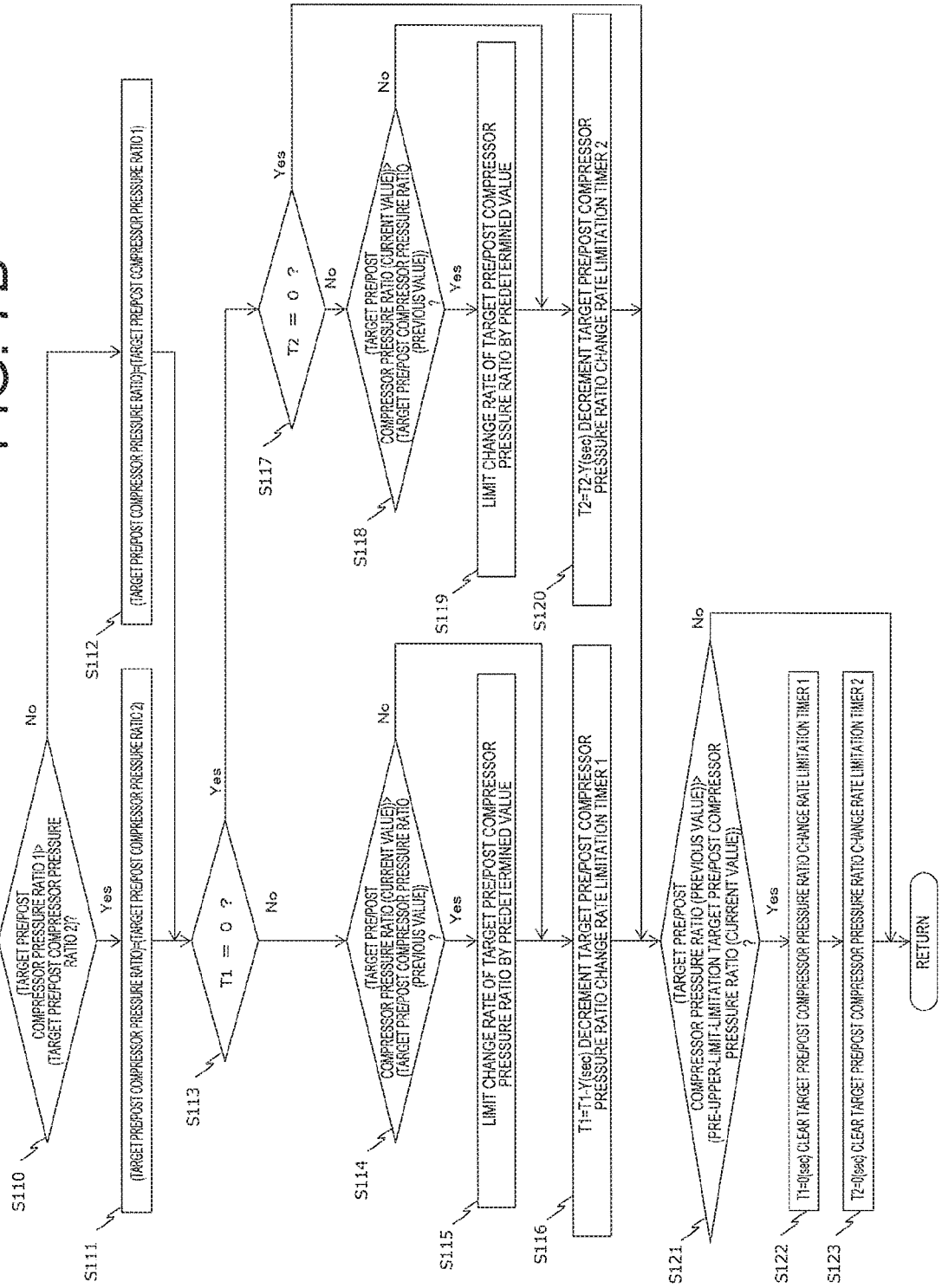

CONTROL DEVICE FOR AN INTERNAL COMBUSTION ENGINE

BACKGROUND OF THE INVENTION

1. Field of the Invention

The present invention relates to a control device for an internal combustion engine, and more particularly, to a control device for an internal combustion engine, which is configured to control an internal combustion engine provided with a turbo charger including a turbine and a compressor.

2. Description of the Related Art

Hitherto, in order to increase output of an engine serving as an internal combustion engine, installation of a turbocharger in the engine has been proposed. The turbocharger is also referred to as "supercharger", and is constructed of a turbine and a compressor. The turbocharger is a device configured to rotate the turbine provided in an exhaust passage with exhaust gas to move the compressor provided in an intake passage, to thereby increase a boost pressure.

In the turbocharger, there is a possibility in that, when the engine is in a high rotation/high load state, the boost pressure increases more than necessary, resulting in a damage in the engine. Therefore, an exhaust bypass passage is usually provided on upstream of the turbine in order to adjust the boost pressure. A wastegate valve is provided in the exhaust bypass passage, and a part of exhaust gas flowing through the exhaust passage is diverted to the exhaust bypass passage by the wastegate valve. In this way, the boost pressure is controlled to an appropriate level by adjusting an inflow amount of the exhaust gas into the turbine.

In other words, an exhaust pressure and the boost pressure of the turbocharger are controlled in correspondence to an opening degree of the wastegate valve. A control amount of the opening degree of the wastegate valve is determined based on the number of revolutions of the engine and a load on the engine through closed loop control corresponding to a target amount of an intake system determined in advance or simple open loop control. Examples of the target amount include a set boost pressure and a set intake air amount.

A control device for an internal combustion engine, which is configured to calculate a wastegate valve control value, is disclosed in, for example, Japanese Patent No. 5420013. In Japanese Patent No. 5420013, first, a target throttle upstream pressure is calculated based on a target charging efficiency and a rotation speed. Then, a target compressor driving force required for driving a turbocharger is calculated based on a target intake air flow rate and the target throttle upstream pressure. Further, an exhaust gas flow rate is calculated based on an air fuel ratio and an intake air flow rate. Then, the wastegate valve control value is calculated based on the exhaust gas flow rate and the target compressor driving force through use of such a relationship that characteristics of the exhaust gas flow rate and a compressor driving force depend only on the wastegate valve control value.

Incidentally, in the turbocharger, when an over rotation occurs, which is a state in which a turbine revolution number being the number of revolutions of the turbocharger is too high, a mechanical load on components of the turbocharger increases. In Japanese Patent No. 5420013, the over rotation of the turbine revolution number is not mentioned.

A method for addressing the over rotation of the turbine revolution number is described in, for example, Japanese Patent No. 5853403. In Japanese Patent No. 5853403, first, a turbine over-rotation suppression boost pressure on downstream of a compressor is calculated through use of an upstream-side intake pressure, which is an intake pressure on an upstream side of the compressor, and a turbine limit revolution number pressure ratio. Then, the turbocharger is controlled based on the turbine over-rotation suppression boost pressure, thereby suppressing occurrence of the over rotation of the turbine.

The control device described in Japanese Patent No. 5853403 is configured to control the turbocharger based on the turbine over-rotation suppression boost pressure when the number of revolutions enters a region more than the turbine limit revolution number from a region equal to or less than the turbine limit revolution number, thereby suppressing occurrence of the over rotation of the turbine. However, in the case where the turbocharger is controlled to attain the turbine over-rotation suppression boost pressure corresponding to an intake air amount based on characteristics of the intake air amount at the turbine limit revolution number and a pre/post compressor pressure ratio, when the number of revolutions enters the region more than the turbine limit revolution number, a control target boost pressure is decreased so that the turbocharger attains the turbine over-rotation suppression boost pressure. As a result, the intake air amount decreases, and the turbine over-rotation suppression boost pressure increases as a result of the decrease in the intake air amount. Therefore, when the control target boost pressure is increased, the intake air amount accordingly increases again. As a result, the turbine over-rotation suppression boost pressure decreases, and the control target boost pressure is decreased. The control may consequently lead to so-called "control hunting", namely, repetition of the above-mentioned series of operations.

Further, as a result of hunting of the pre/post compressor pressure ratio, feedback control for the opening degree of the wastegate valve diverges, resulting in control toward a closing side, which may consequently lead to the over rotation of the turbine.

SUMMARY OF THE INVENTION

The present invention has been made in view of the above-mentioned problem, and therefore has an object to provide a control device for an internal combustion engine, which is capable of suppressing occurrence of an over rotation of a turbine of a turbo charger and suppressing occurrence of control hunting.

According to one embodiment of the present invention, there is provided a control device for an internal combustion engine, which is configured to control an internal combustion engine provided for a vehicle, the vehicle including: a throttle valve, which is provided in an intake passage of the internal combustion engine; an air flow sensor, which is configured to detect an intake air flow rate in the intake passage of the internal combustion engine; a turbocharger, which includes a turbine provided in an exhaust passage of the internal combustion engine, and a compressor provided in the intake passage of the internal combustion engine and configured to rotate integrally with the turbine; an exhaust bypass passage, which is configured to allow an upstream side and a downstream side of the turbine to communicate to each other; a wastegate valve, which is provided in the exhaust bypass passage, and is configured to adjust a flow rate of exhaust gas of the internal combustion engine, which flows through the exhaust bypass passage; an actuator, which is configured to drive the wastegate valve to change an open position of the wastegate valve; and a throttle upstream pressure sensor, which is configured to detect an actual throttle upstream pressure having an actual value of a pressure of intake air on an upstream side of the throttle valve, which is compressed by the compressor, the control device for an internal combustion engine including: a target throttle upstream pressure calculation part, which is configured to calculate a target throttle upstream pressure having a target value of the pressure of the intake air compressed by the compressor, based on an operation state of the internal combustion engine; a target pre/post compressor pressure ratio calculation part, which is configured to calculate a target pre/post compressor pressure ratio based on the target throttle upstream pressure; a feedback correction amount calculation part, which is configured to carry out feedback control corresponding to a difference between the actual throttle upstream pressure detected by the throttle upstream pressure sensor and the target throttle upstream pressure calculated by the target throttle upstream pressure calculation part, to thereby calculate a feedback correction amount for a target opening degree of the wastegate valve based on the target pre/post compressor pressure ratio; a target opening-degree calculation part, which is configured to calculate, based on the feedback correction amount, the target opening degree of the wastegate valve required for matching the actual throttle upstream pressure with the target throttle upstream pressure to output the target opening degree to the actuator; a compressor passage flow rate calculation part, which is configured to calculate a compressor passage flow rate passing through the compressor based on the intake air flow rate detected by the air flow sensor; a compressor upstream-side pressure calculation part, which is configured to calculate a pressure on an upstream side of the compressor based on an atmospheric pressure; a compressor downstream-side pressure calculation part, which is configured to calculate a pressure on a downstream side of the compressor from the actual throttle upstream pressure detected by the throttle upstream pressure sensor; and a turbine-limit-time pre/post compressor pressure ratio calculation part, which is configured to calculate, based on the compressor passage flow rate, a turbine-limit-time pre/post compressor pressure ratio being a pressure ratio of the pressure on the downstream side to the pressure on the upstream side of the compressor at a turbine limit revolution number, in which: the target pre/post compressor pressure ratio calculation part is configured to compare the target pre/post compressor pressure ratio and the turbine-limit-time pre/post compressor pressure ratio with each other, and to carry out upper limit limitation processing of limiting the target pre/post compressor pressure ratio by the turbine-limit-time pre/post compressor pressure ratio when the target pre/post compressor pressure ratio is more than the turbine-limit-time pre/post compressor pressure ratio; and the target pre/post compressor pressure ratio calculation part is configured to carry out change rate limitation processing of limiting a change rate of the target pre/post compressor pressure ratio limited by the turbine-limit-time pre/post compressor pressure ratio so as to avoid exceeding a change rate limit value set in advance during a period set in advance after execution of the upper limit limitation processing starts.

With the control device for an internal combustion engine according to the present invention, when the target pre/post compressor pressure ratio exceeds the turbine-limit-time pre/post compressor pressure ratio, the upper limit of the target pre/post compressor pressure ratio is limited by the turbine-limit-time pre/post compressor pressure ratio, and the change rate of the target pre/post compressor pressure ratio is limited by the change rate limit value during the period set in advance, thereby enabling the prevention of the sudden fluctuation of the target pre/post compressor pressure ratio due to the sudden fluctuation of the compressor passage flow rate, resulting in the suppression of the occurrence of the over rotation of the turbine and the occurrence of the control hunting.

BRIEF DESCRIPTION OF THE DRAWINGS

FIG. 5A is a timing chart for illustrating an example of behaviors of a compressor passage flow rate and a target pre/post compressor pressure ratio during an acceleration transient operation in a related-art device.

FIG. 5B is a timing chart for illustrating an example of behaviors of a compressor passage flow rate and a target pre/post compressor pressure ratio during an acceleration transient operation in the control device for an internal combustion engine according to the first embodiment of the present invention.

FIG. 5C is a timing chart for illustrating an example of the behaviors of the compressor passage flow rate and the target pre/post compressor pressure ratio during the acceleration transient operation in the control device for an internal combustion engine according to the first embodiment of the present invention.

FIG. 5D is a timing chart for illustrating an example of the behaviors of the compressor passage flow rate and the target pre/post compressor pressure ratio during the acceleration transient operation in the control device for an internal combustion engine according to the first embodiment of the present invention.

FIG. 6 is a table for showing an example of a map for determining a target throttle upstream pressure in the control device for an internal combustion engine according to the first embodiment of the present invention.

FIGS. 7A and 7B are flowcharts for illustrating an example of an operation of a target pre/post compressor pressure ratio calculation part in the control device for an internal combustion engine according to the first embodiment of the present invention.

DESCRIPTION OF THE EMBODIMENTS

First Embodiment

Figure 1:
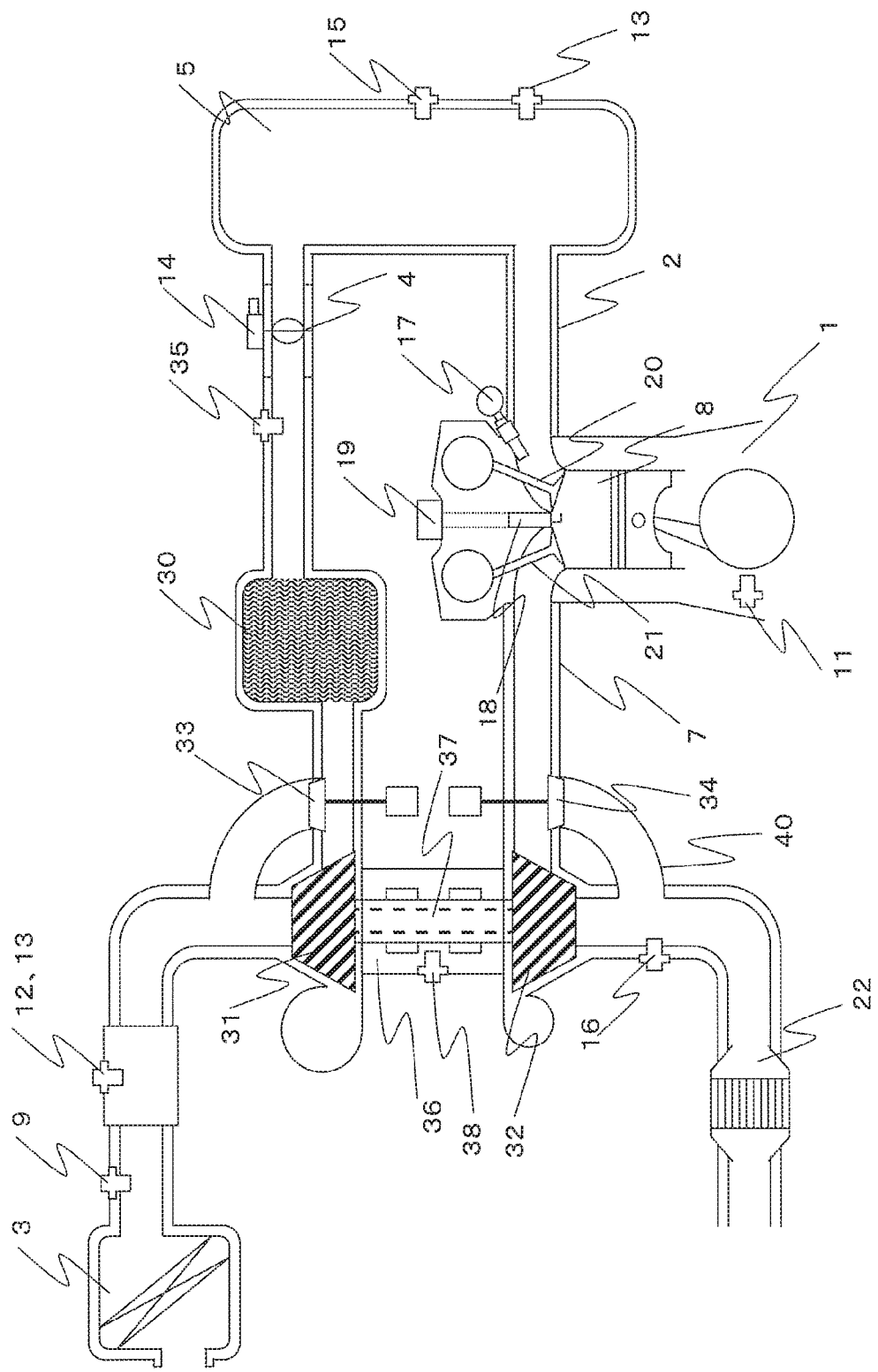
FIG. 1 is a configuration diagram for schematically illustrating a configuration of an intake/exhaust system of a control device for an internal combustion engine according to a first embodiment of the present invention.

FIG. 1 is a configuration diagram for schematically illustrating a configuration of an intake system and an exhaust system of an engine to be controlled by a control device for an internal combustion engine according to a first embodiment of the present invention. The configuration of FIG. 1 including this engine is provided in a vehicle. In FIG. 1, a crank angle sensor 11 configured to generate an electric signal corresponding to a rotational angle of a crankshaft of an engine 1 is provided for the crankshaft. Moreover, an intake pipe 2 for forming an intake passage and an exhaust pipe 7 for forming an exhaust passage are respectively connected to an intake port and an exhaust port of a combustion chamber of the engine 1.

An air cleaner 3 configured to clean outside air taken into the intake pipe 2 is mounted to the most upstream end of the intake pipe 2. The intake pipe 2 is provided with an air flow sensor 12 and an intake air temperature sensor 13 on a downstream side of the air cleaner 3, in other words, on a side closer to the engine 1. The air flow sensor 12 is configured to generate an electric signal corresponding to an intake air flow rate. The intake air temperature sensor 13 is configured to generate an electric signal corresponding to an intake air temperature. In FIG. 1, an example in which the air flow sensor 12 and the intake air temperature sensor 13 are constructed integrally with each other is illustrated, but the present invention is not limited to this example, and the air flow sensor 12 and the intake air temperature sensor 13 may be constructed independently of each other. In addition, an atmospheric-pressure sensor 9 configured to generate an electric signal corresponding to an atmospheric pressure is provided on the downstream side of the air cleaner 3 on the intake pipe 2. The atmospheric-pressure sensor 9 may be built in an ECU 100 described later.

An exhaust gas purification catalyst 22 is provided on the exhaust pipe 7. In the exhaust pipe 7, on an upstream side of the exhaust gas purification catalyst 22, that is, on the side closer to the engine 1, an air-fuel ratio sensor 16 configured to generate an electric signal corresponding to a ratio of a fuel or oxygen in a combustion gas is provided.

Moreover, a turbocharger 36 is provided in the intake/exhaust system constructed of the intake pipe 2 and the exhaust pipe 7. The turbo charger 36 includes a compressor 31, a turbine 32, and a shaft 37 for coupling the compressor 31 and the turbine 32 to each other. The turbine 32 is provided on the upstream side of the exhaust gas purification catalyst 22 of the exhaust pipe 7, and is configured to be driven for rotation by the exhaust gas communicating through the exhaust pipe 7. The compressor 31 is provided on the downstream side of the air cleaner 3 on the intake pipe 2. The compressor 31 is configured to be driven for rotation by the rotation of the turbine 32 to compress the air in the intake passage.

A turbocharger rotation sensor 38 configured to measure a turbocharger rotation speed Nt is provided in the turbocharger 36. Instead of using the turbocharger rotation sensor configured to directly measure the turbocharger rotation speed Nt, a method of estimating the turbocharger rotation speed Nt from sensor information from other sensors may be used.

An air bypass valve 33 is provided on a downstream side of the compressor 31. The air bypass valve 33 is configured to divert compressed air to an upstream side of the compressor 31 so as to prevent a boost pressure from becoming too high to damage the intake pipe 2 mainly when an accelerator is released. An intercooler 30 configured to cool the compressed air is provided on a downstream side of the air bypass valve 33. A throttle valve 4 configured to adjust an air amount fed to the engine 1 is provided on a downstream side of the intercooler 30. A throttle position sensor 14 configured to generate an electric signal corresponding to an opening degree of the throttle valve 4 is connected to the throttle valve 4. Moreover, a throttle upstream pressure sensor 35 is provided on an upstream side of the throttle valve 4. The throttle upstream pressure sensor 35 is configured to generate an electric signal corresponding to an air pressure between the intercooler 30 and the throttle valve 4, namely, a throttle upstream pressure P2. The throttle upstream pressure P2 detected by the throttle upstream pressure sensor 35 corresponds to an actual throttle upstream pressure, which is an actual value of the pressure of the intake air compressed by the compressor 31. In place of the throttle upstream pressure sensor 35 configured to directly measure the throttle upstream pressure P2, there may be provided a throttle upstream pressure estimation part configured to calculate an estimation value of the throttle upstream pressure P2 from sensor information from other sensors.

Further, a surge tank 5 for suppressing an intake air pulsation is provided on a downstream side of the throttle valve 4 on the intake pipe 2. An intake manifold pressure sensor 15 configured to generate an electric signal corresponding to an air pressure in the surge tank 5 is provided to the surge tank 5. The airflow sensor 12 and the intake manifold pressure sensor 15 may be both provided, or only the intake manifold pressure sensor 15 may be provided. In a case where only the intake manifold pressure sensor 15 is installed, the intake air temperature sensor 13 is provided to the surge tank 5, as illustrated in FIG. 1. Although FIG. 1 is an illustration of an example in which both the sensors 15 and 13 are constructed independently of each other, the sensors 15 and 13 may be provided integrally.

An injector 17 configured to inject fuel toward the intake port of the combustion chamber of the engine 1 is provided on a downstream side of the surge tank 5 on the intake pipe 2. The injector 17 may be provided so as to directly inject the fuel into a cylinder 8.

An ignition plug 18 and an ignition coil 19 are provided in a top portion of the cylinder 8. The ignition plug 18 is configured to ignite a combustible mixture generated by mixing the air taken into the engine 1 and the fuel injected from the injector 17. The ignition coil 19 is configured to generate spark on the ignition plug 18. Moreover, an intake valve 20 configured to adjust an air amount introduced from the intake pipe 2 to the cylinder 8 is provided at the intake port of the combustion chamber of the engine 1, and an exhaust valve 21 configured to adjust an air amount exhausted from the cylinder 8 to the exhaust pipe 7 is provided at the exhaust port of the combustion chamber of the engine 1.

Figure 2:
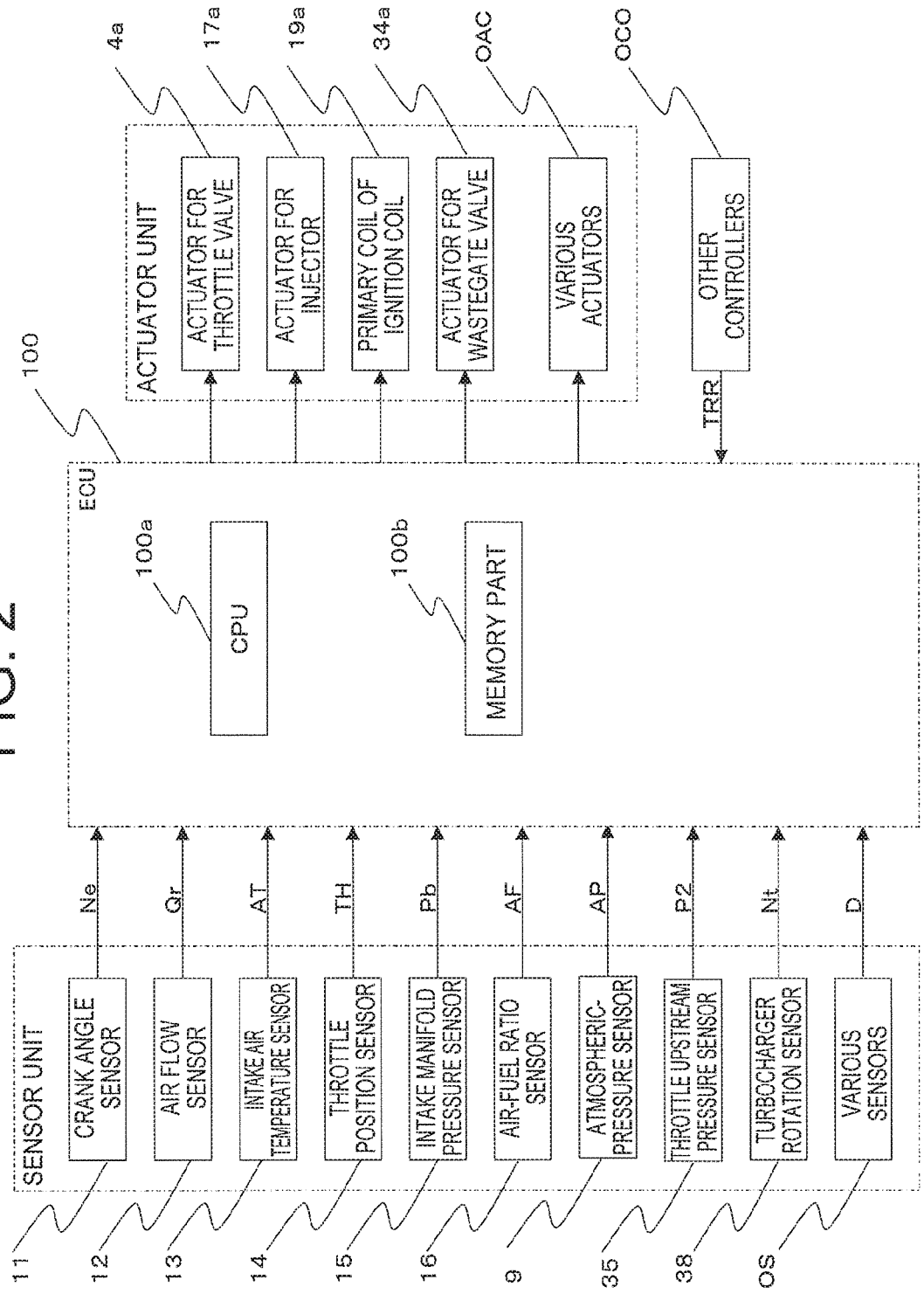
FIG. 2 is a block diagram for schematically illustrating a configuration of the control device for an internal combustion engine according to the first embodiment of the present invention.

On an upstream side of the turbine 32, there is provided a wastegate valve 34 configured to divert the exhaust gas to the exhaust bypass passage 40 so as to prevent the engine 1 from being damaged when the boost pressure increases in a high rotation/high load state. The exhaust bypass passage 40 is provided so that the upstream side and a downstream side of the turbine 32 communicate to each other. The wastegate valve 34 is provided on the upstream side of the turbine 32, and is configured to change a flow passage sectional area of the exhaust bypass passage 40. As a result, the flow rate of the exhaust gas flowing through the exhaust bypass passage 40 is adjusted. The wastegate valve 34 is driven by an actuator 34a of the wastegate valve 34, which is illustrated in FIG. 2 described later. The actuator 34a may be any one of a pressure actuator configured to control a pressure applied to a diaphragm and an electric actuator configured to drive a valve through direct instruction of a valve opening degree.

FIG. 2 is a block diagram for schematically illustrating a configuration of a control system of the control device for an internal combustion engine according to the first embodiment of the present invention. In FIG. 2, an electronic control unit 100 is configured to receive the electric signals respectively generated by the crank angle sensor 11, the airflow sensor 12, the intake air temperature sensor 13, the throttle position sensor 14, the intake manifold pressure sensor 15, and the air-fuel ratio sensor 16. The electronic control unit 100 is hereinafter referred to as "ECU 100".

Moreover, the ECU 100 is configured to receive the electric signals respectively generated by the atmospheric-pressure sensor 9, the throttle upstream pressure sensor 35, and the turbocharger rotation sensor 38, which are necessary for the turbocharger 36. Further, the ECU 100 is also configured to receive electric signals from various sensors OS other than the above-mentioned sensors 9, 11 to 16, 35, and 38. Those various sensors OS include an accelerator position sensor configured to generate an electric signal corresponding to an operation amount of the accelerator, a sensor for combustion control of the engine 1, sensors for behavior control of the vehicle, and the like. The sensors for the behavior control of the vehicle include, for example, a vehicle speed sensor, a water temperature sensor, and the like.

Further, the ECU 100 is configured to calculate an estimated output torque obtained by estimating an actual torque generated from the engine 1, based on pieces of input data (a) to (i) input from the respective sensors 9, 11 to 16, 35, and OS, which are described below, and calculate a target output torque based on the input data from the respective sensors 9, 11 to 16, 35, and OS, and a torque request value TRR from other controllers OCO. The other controllers OCO include, for example, respective controllers for transmission control, brake control, traction control, stability control, and the like.

(a) A rotation speed Ne from the crank angle sensor 11

(b) An actually measured air flow rate Qr from the airflow sensor 12

(c) An intake air temperature AT from the intake air temperature sensor 13

(d) A throttle opening degree TH from the throttle position sensor 14

(e) An intake manifold pressure Pb from the intake manifold pressure sensor 15

(f) An air-fuel ratio AF from the air-flow ratio sensor 16

(g) An atmospheric pressure AP from the atmospheric-pressure sensor 9

(h) The throttle upstream pressure P2 from the throttle upstream pressure sensor 35

(i) An accelerator opening degree D from the accelerator opening-degree sensor (OS) configured to detect the opening degree of the accelerator provided to the vehicle Further, in order to achieve the target output torque, the ECU 100 refers to the air-fuel ratio AF and control target values to control an actuator 4a of the throttle valve 4 so as to achieve a target value of a target intake air flow rate Qat, drive an actuator 17a of the injector 17 so as to achieve a target value of the air-fuel ratio AF, energize a primary coil 19a of the ignition coil 19 so as to achieve a target value of an ignition timing, and drive the actuator 34a of the wastegate valve 34 so as to achieve a target value of a wastegate valve opening degree. The respective target values include, for example, a phase angle in intake or exhaust variable valve timing (VVT) control, an exhaust gas recirculation (EGR) rate, and an ignition timing.

Further, the ECU 100 is also configured to calculate target values for various actuators OAC for various devices, other than the actuators described above.

In this case, the ECU 100 is a microprocessor including a CPU 100a and a memory part 100b. The CPU 100a executes calculation processing. The memory part 100b includes a ROM for storing program data and fixed-value data, and a RAM for updating the stored data to be sequentially rewritten.

Figure 3:
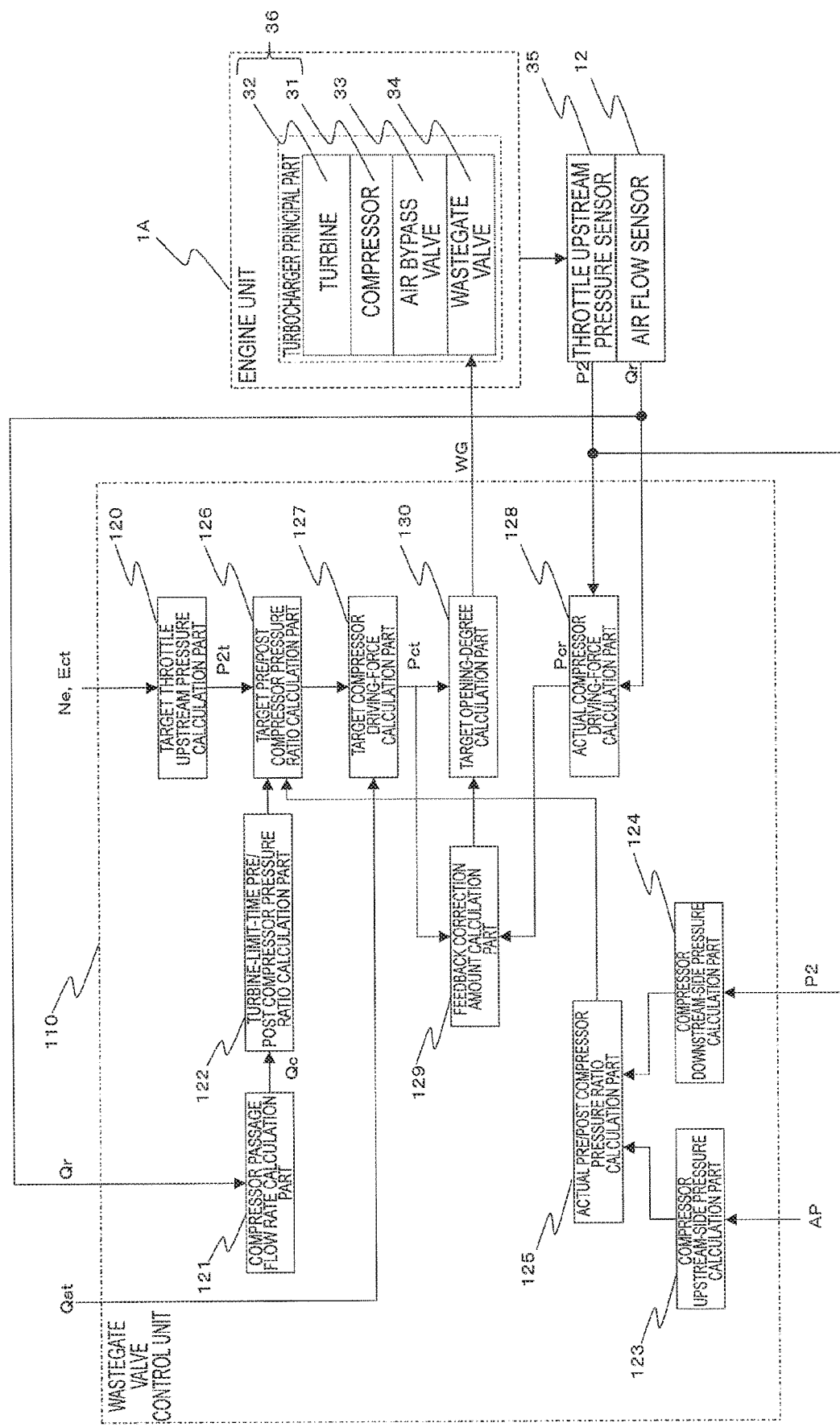
FIG. 3 is a functional block diagram for illustrating an example of a configuration of a wastegate valve control unit in an ECU of FIG. 2 and its related parts.

FIG. 3 is a functional block diagram for illustrating an example of a functional configuration of a wastegate valve control unit 110 provided in the ECU 100 of FIG. 2 and its related parts. Respective functions 120 to 130 of the wastegate valve control unit 110 illustrated in FIG. 3 are implemented by software. The software is described as programs, and is stored in the ROM Of the memory part 100b of the ECU 100. The CPU 100a of the ECU 100 is configured to read and execute the programs stored in the ROM, thereby implementing the respective functions 120 to 130 of the wastegate valve control unit 110.

As illustrated in FIG. 3, the wastegate valve control unit 110 includes a target throttle upstream pressure calculation part 120, a compressor passage flow rate calculation part 121, a turbine-limit-time pre/post compressor pressure ratio calculation part 122, a compressor upstream-side pressure calculation part 123, a compressor downstream-side pressure calculation part 124, an actual pre/post compressor pressure ratio calculation part 125, a target pre/post compressor pressure ratio calculation part 126, a target compressor driving-force calculation part 127, an actual compressor driving-force calculation part 128, a feedback correction amount calculation part 129, and a target opening-degree calculation part 130.

In FIG. 3, as an engine unit 1A, only a principal part relating to the turbocharger 36 is illustrated among the configurations in the intake/exhaust system of FIG. 1. In FIG. 3, as the turbocharger principal part, only the turbine 32, the compressor 31, the air bypass valve 33, and the wastegate valve 34 are illustrated. Moreover, in FIG. 3, as representatives of the respective sensors, only the throttle upstream pressure sensor 35 and the air flow sensor 12 are illustrated.

A description is now given of the respective functions 120 to 130 of the wastegate valve control unit 110.

The target throttle upstream pressure calculation part 120 is configured to calculate a target throttle upstream pressure P2t, which is a target value of the pressure of the intake air compressed by the compressor 31, based on the operation state of the engine 1. On this occasion, as information on the operation state of the engine 1, for example, the rotation speed Ne and a target charging efficiency Ect of the engine 1 are used. The rotation speed Ne of the engine 1 is detected by the above-mentioned crank angle sensor 11.

Referring to FIG. 6, a specific description is now given of an example of a method of calculating, by the target throttle upstream pressure calculation part 120, the target throttle upstream pressure P2t. FIG. 6 is a table for showing an example of a map for determining the target throttle upstream pressure P2t. In the map shown in FIG. 6, the unit of the target throttle upstream pressure is kPa. In the map of FIG. 6, values of the target throttle upstream pressure P2t are stored in advance while the number of revolutions of the engine being the rotation speed Ne of the engine 1 and the accelerator opening degree are set to two axes. Thus, the target throttle upstream pressure calculation part 120 is configured to refer to the map of FIG. 6, thereby being capable of uniquely determining the value of the target throttle upstream pressure P2t from the rotation speed Ne of the engine 1 and the accelerator opening degree.

The compressor passage flow rate calculation part 121 is configured to calculate a compressor passage flow rate Qc to which environment correction to a standard air state is made at a standard temperature and a standard pressure, in accordance with Expression 1 based on the actually measured air flow rate Qr detected by the air flow sensor 12, the intake air temperature AT, and the atmospheric pressure AP.

$$Qc=Qr \times \sqrt{(AT/293.15)} \times 101.32/AP \quad \text{(Expression 1)}$$

The turbine-limit-time pre/post compressor pressure ratio calculation part 122 is configured to calculate a turbine-limit-time pre/post compressor pressure ratio corresponding to the compressor passage flow rate with the turbine limit time based on characteristic data representing a relationship between the compressor passage flow rate at the rotation at the turbine limit revolution number and the pre/post compressor pressure ratio.

Figure 4:
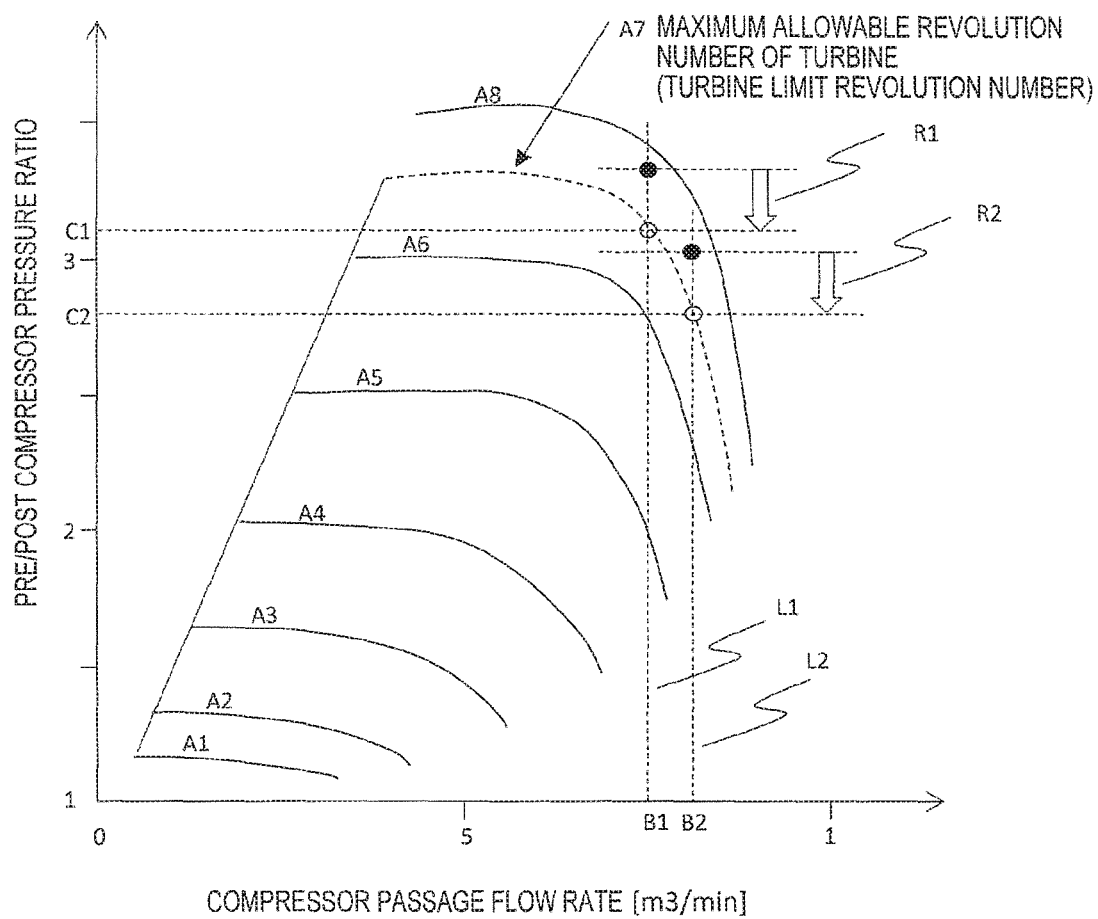
FIG. 4 is a graph for showing an example of a calculation table for determining a turbine-limit-time pre/post compressor pressure ratio in the control device for an internal combustion engine according to the first embodiment of the present invention.

FIG. 4 is a diagram for showing an example of a calculation table for determining a turbine-limit-time pre/post compressor pressure ratio by the turbine-limit-time pre/post compressor pressure ratio calculation part 122. FIG. 4 has the compressor passage flow rate as a horizontal axis, and a pre/post compressor pressure ratio, which is a ratio of the compressor downstream-side pressure to the compressor upstream-side pressure as a vertical axis.

Characteristic curves A1 to A8 of FIG. 4 respectively represent a correlation between the compressor passage flow rate and the pre/post compressor pressure ratio when the numbers of revolutions of the turbine 32 are constant. The characteristic curves A1 to A8 in terms of the number of revolutions of the turbine 32 have a relationship of "number of revolutions of A1<number of revolutions of A2< . . . <number of revolutions of A8". The characteristic curve A7 represented as the broken line indicates a correlation at a maximum allowable number of revolutions of the turbine 32, namely, a correlation at a turbine limit revolution number. In FIG. 6, for example, it is found that the value of the turbine-limit-time pre/post compressor pressure ratio for a compressor passage flow rate B1 is C1 from an intersection between a line L1 for the compressor passage flow rate B1 and the characteristic curve A7. In a similar manner, it is found that the value of the turbine-limit-time pre/post compressor pressure ratio for a compressor passage flow rate B2 is C2 from an intersection between a line L2 for the compressor passage flow rate B2 and the characteristic curve A7. In this way, the turbine-limit-time pre/post compressor pressure ratio calculation part 122 can use the turbine limit revolution number curve A7 shown in FIG. 6 to uniquely acquire the value of the turbine-limit-time pre/post compressor pressure ratio corresponding to the compressor passage flow rate. As is understood from the characteristic curve A7 of FIG. 4, there is such a tendency that as the compressor passage flow rate increases, the turbine-limit-time pre/post compressor pressure ratio decreases, and, as the compressor passage flow rate decreases, on the other hand, the turbine-limit-time pre/post compressor pressure ratio increases.

As a supplementary description, the following is given. Pre/post compressor pressures indicated by the two black dots of FIG. 4 are respectively in a region more than the turbine-limit-time pre/post compressor pressure ratio C1 at the compressor passage flow rate B1 and in a region more than the turbine-limit-time pre/post compressor pressure ratio C2 at the compressor passage flow rate B2. As the black dots indicate, when the target pre/post compressor pressure ratio enters the region more than the turbine-limit-time pre/post compressor pressure ratio, an upper limit of the target pre/post compressor pressure ratio is required to be limited as arrows R1 and R2 indicate so as not to exceed the turbine-limit-time pre/post compressor pressure ratio. A description is given of the limitation on the upper limit later.

The compressor upstream-side pressure calculation part 123 is configured to calculate a compressor upstream-side pressure P_comp_up corrected for a pressure loss amount P_loss_in of the intake system in accordance with Expression 2 based on the atmospheric pressure AP detected by the atmospheric-pressure sensor 9.

$$P\_comp\_up = AP - P\_loss\_in \quad \text{(Expression 2)}$$

The compressor downstream-side pressure calculation part 124 is configured to calculate a compressor downstream-side pressure P_comp_down corrected for a pressure loss amount P_loss_ic before and after the intercooler 30 in accordance with Expression 3 based on the throttle upstream pressure P2 detected by the throttle upstream pressure sensor 35.

$$P\_comp\_down = P2 + P\_loss\_ic \quad \text{(Expression 3)}$$

The actual pre/post compressor pressure ratio calculation part 125 is configured to calculate an actual pre/post compressor pressure ratio P_comp, which is a ratio of the compressor downstream-side pressure P_comp_down calculated by the compressor downstream-side pressure calculation part 124 to the compressor upstream-side pressure P_comp_up calculated by the compressor upstream-side pressure calculation part 123, in accordance with Expression 4 based on the compressor upstream-side pressure and the compressor downstream-side pressure.

$$P\_comp = P\_comp\_down / P\_comp\_up \quad \text{(Expression 4)}$$

The target pre/post compressor pressure ratio calculation part 126 is configured to receive the target throttle upstream pressure P2t calculated by the target throttle upstream pressure calculation part 120, and to correct the target throttle upstream pressure P2t for the pressure decrease amount P_loss_ic before and after the intercooler 30 in accordance with Expression 5 and Expression 6, to thereby acquire a target compressor downstream pressure P_comp_down_t. The target pre/post compressor pressure ratio calculation part 126 is configured to divide the target compressor downstream pressure by the compressor upstream-side pressure P_comp_up, to thereby calculate a target pre/post compressor pressure ratio P_comp_t.

$$P\_comp\_down\_t = P2t + P\_loss\_ic \quad \text{(Expression 5)}$$

$$P\_comp\_t = P\_comp\_down\_t / P\_comp\_up \quad \text{(Expression 6)}$$

Moreover, the target pre/post compressor pressure ratio calculation part 126 is configured to carry out "upper limit limitation" processing of limiting the upper limit of the calculated target pre/post compressor pressure ratio by the turbine-limit-time pre/post compressor pressure ratio calculated by the turbine-limit-time pre/post compressor pressure ratio calculation part 122, to thereby control the target pre/post compressor pressure ratio not to exceed the turbine-limit-time pre/post compressor pressure ratio.

Moreover, when the target pre/post compressor pressure ratio changes toward an increase side during the "upper limit limitation" processing, the target pre/post compressor pressure ratio calculation part 126 carries out "change rate limitation" processing of limiting a change rate toward the increase side of the target pre/post compressor pressure ratio during a period set in advance starting from a time point of the change. As a result, even when the compressor passage flow rate suddenly changes, the target pre/post compressor pressure ratio can be controlled so as not to suddenly change.

Further, when the actual pre/post compressor pressure ratio calculated by the actual pre/post compressor pressure ratio calculation part 125 exceeds the turbine-limit-time pre/post compressor pressure ratio calculated by the turbine-limit-time pre/post compressor pressure ratio calculation part 122, the target pre/post compressor pressure ratio calculation part 126 carries out "correction toward decrease side" processing of correcting the target pre/post compressor pressure ratio toward the decrease side based on the excessive pressure ratio. However, the "correction toward decrease side" is not necessarily required to be carried out.

In addition, when the target pre/post compressor pressure ratio changes toward an increase side during the "correction toward decrease side" processing, the target pre/post compressor pressure ratio calculation part 126 carries out the "change rate limitation" processing of limiting the change rate toward the increase side of the target pre/post compressor pressure ratio during a period set in advance starting from a time point of the change. As a result, even when the compressor passage flow rate suddenly changes, the target pre/post compressor pressure ratio after the correction toward the decrease side can be controlled so as not to suddenly change.

The target compressor driving-force calculation part 127 is configured to calculate a target compressor driving force Pct based on the target pre/post compressor pressure ratio calculated by the target pre/post compressor pressure ratio calculation part 126 and the target intake air flow rate Qat.

The actual compressor driving-force calculation part 128 is configured to calculate an actual compressor driving force Pcr based on the throttle upstream pressure P2 and the actually measured air flow rate Qr.

On this occasion, the target charging efficiency Ect used by the target throttle upstream pressure calculation part 120, the target intake air flow rate Qat used by the target compressor driving-force calculation part 127, the target compressor driving force Pct calculated by the target compressor driving-force calculation part 127, and the actual compressor driving force Pcr calculated by the actual compressor driving-force calculation part 128 may be calculated through publicly known calculation methods, for example, calculation methods described in paragraphs [0028] to [0105] of Japanese Patent No. 5420013.

The feedback correction amount calculation part 129 is configured to carry out feedback control, which is PID control, so that a difference between the actual compressor driving force Pcr calculated by the actual compressor driving-force calculation part 128 and the target compressor driving force Pct calculated by the target compressor driving-force calculation part 127 decreases, based on the actual compressor driving force Pcr and the target compressor driving force Pct, to thereby calculate FB(P), FB(I), and FB(D), which are feedback correction amounts of a wastegate valve target opening degree WG. FB(P) is a proportional term, FB(I) is an integral term, and FB(D) is a derivative term. The feedback correction amount calculation part 129 is configured to practically carry out feedback control in correspondence to a difference between the actual throttle upstream pressure detected by the throttle upstream pressure sensor 35 and the target throttle upstream pressure calculated by the target throttle upstream pressure calculation part 120, to thereby calculate the feedback correction amounts for the target opening degree of the wastegate valve 34.

The target opening-degree calculation part 130 is configured to use a wastegate valve full-opening degree WGb_max and an opening-degree conversion coefficient K_wg to calculate a wastegate valve basic opening degree WGb in accordance with, for example, Expression 7 based on the target compressor driving force Pct calculated by the target compressor driving-force calculation part 127. Further, the target opening-degree calculation part 130 is configured to calculate a wastegate valve opening degree WG, which is a target opening degree of the wastegate valve 34 required for matching the actual throttle upstream pressure with the target throttle upstream pressure. In other words, the target opening-degree calculation part 130 is configured to calculate the wastegate valve opening degree WG in accordance with Expression 8 based on the wastegate valve basic opening degree WGb, which has been calculated, and the feedback correction amounts FB(P), FB (I), and FB(D) of the wastegate valve target opening degree WG calculated by the feedback correction amount calculation part 129.

$$WGb = WGb\_\text{max} - (Pct \times K\_wg) \qquad \text{(Expression 7)}$$

$$WG = WGb + (FB(P) + FB(I) + FB(D)) \qquad \text{(Expression 8)}$$

The wastegate valve opening degree WG, which is input to the wastegate valve 34 in the illustration of FIG. 3, is actually input to the actuator 34a (refer to FIG. 2) of the wastegate valve 34. The actuator 34a of the wastegate valve 34 is configured to drive the wastegate valve 34 based on the wastegate valve opening degree WG.

FIG. 5B to FIG. 5D are timing charts for illustrating an example of a behavior and an operation of the control device for an internal combustion engine according to the first embodiment of the present invention. FIG. 5A is a timing chart for illustrating a case in which the control other than the "upper limit limitation" according to the first embodiment is not carried out, which is referred to for the sake of comparison with FIG. 5B and FIG. 5D.

Horizontal axes of FIG. 5A to FIG. 5D represent time.

Moreover, in FIG. 5A to FIG. 5D, (1) to (6) assigned to vertical axes represent the pre/post compressor pressure ratios and the compressor passage flow rate.

Specifically, a thick solid line (1) represents the target pre/post compressor pressure ratio calculated by the target pre/post compressor pressure ratio calculation part 126. The target pre/post compressor pressure ratio is hereinafter referred to as "target pre/post compressor pressure ratio (1)".

Moreover, a one-dot chain line (2) represents the actual pre/post compressor pressure ratio calculated by the actual pre/post compressor pressure ratio calculation part 125. The actual pre/post compressor pressure ratio is hereinafter referred to as "actual pre/post compressor pressure ratio (2)".

Moreover, a two-dot chain line (3) represents the compressor passage flow rate calculated by the compressor passage flow rate calculation part 121. The compressor passage flow rate is hereinafter referred to as "compressor passage flow rate (3)".

Moreover, a thin solid line (4) represents the turbine-limit-time pre/post compressor pressure ratio calculated by the turbine-limit-time pre/post compressor pressure ratio calculation part 122. The turbine-limit-time pre/post compressor pressure ratio is hereinafter referred to as "turbine-limit-time pre/post compressor pressure ratio (4)".

Moreover, in FIG. 5C and FIG. 5D, a dotted line (5) represents a pre-upper-limit-limitation target pre/post compressor pressure ratio calculated by the target pre/post compressor pressure ratio calculation part 126. The pre-upperlimit-limitation target pre/post compressor pressure ratio is hereinafter referred to as "pre-upper-limit-limitation target pre/post compressor pressure ratio (5)".

In addition, in FIG. 5C, a broken line (6) represents a decrease-side correction pre/post compressor pressure ratio calculated by the target pre/post compressor pressure ratio calculation part 126. The decrease-side correction pre/post compressor pressure ratio is hereinafter referred to as "decrease-side correction pre/post compressor pressure ratio (6)".

The processing illustrated in the timing charts of FIG. 5A to FIG. 5D is carried out by the ECU 100 as interrupt processing after each preset period.

First, a description is given of FIG. 5A. FIG. 5A is an illustration of a case in which the "upper limit limitation" processing is carried out when the target pre/post compressor pressure ratio (1) exceeds the turbine-limit-time pre/post compressor pressure ratio (4). However, FIG. 5A is an illustration of an operation example in a case in which the "change rate limitation" processing, which is one of processing steps of the control of the first embodiment, is not carried out.

First, in a period A, the target pre/post compressor pressure ratio (1) increases as a result of an acceleration request from a driver of the vehicle. Moreover, the actual pre/post compressor pressure ratio (2) follows the target pre/post compressor pressure ratio (1) to increase, and the compressor passage flow rate (3) simultaneously increases.

In a period B, as a result of the increase in the compressor passage flow rate (3), the turbine-limit-time pre/post compressor pressure ratio (4) decreases as described referring to FIG. 4. As a result, at a time point t1, the target pre/post compressor pressure ratio (1) exceeds the turbine-limit-time pre/post compressor pressure ratio (4). Then, subsequently to the time point t1, in a period in which a relationship of "(target pre/post compressor pressure ratio (1))>(turbine-limit-time pre/post compressor pressure ratio (4))" holds true, the "upper limit limitation" processing of limiting the upper limit of the target pre/post compressor pressure ratio (1) by the turbine-limit-time pre/post compressor pressure ratio (4) is carried out.

As a result of the decrease in the target pre/post compressor pressure ratio (1) by the "upper limit limitation" processing, the target compressor driving force decreases. As a result, the target wastegate valve opening degree increases, the number of revolutions of the compressor decreases, and the compressor passage flow rate (3) decreases after a delay. As a result of the decrease in the compressor passage flow rate (3), the turbine-limit-time pre/post compressor pressure ratio (4) increases. Consequently, the target pre/post compressor pressure ratio (1) whose upper limit is limited by the turbine-limit-time pre/post compressor pressure ratio (4) also increases. When the compressor passage flow rate (3) further decreases, the turbine-limit-time pre/post compressor pressure ratio (4) increases. As a result, when a relationship of "(target pre/post compressor pressure ratio (1))≤(turbine-limit-time pre/post compressor pressure ratio (4))" holds true, the upper limit limitation on the target pre/post compressor pressure ratio (1) is released.

In a period C, the compressor passage flow rate (3) has decreased, and the upper limit of the target pre/post compressor pressure ratio (1) is not limited. The actual pre/post compressor pressure ratio (2), which has decreased after the delay as a result of the decrease in the target pre/post compressor pressure ratio (1) in the period B, thus increases again.

Thereafter, as illustrated in FIG. 5A, the series of operations in the period B and the period C, which are described above, are repeated, resulting in control hunting. Moreover, when a delay in the feedback system that is a time required for the actual pre/post compressor pressure ratio (2) to follow the target pre/post compressor pressure ratio (1) after the target pre/post compressor pressure ratio (1) changes, and a fluctuation cycle of the target pre/post compressor pressure ratio (1) caused by a fluctuation in the compressor passage flow rate (3) match each other, the feedback control may diverge, and the wastegate valve opening degree may be controlled toward the closing side, resulting in an over rotation of the turbine. If the "change rate limitation" processing according to the first embodiment is not carried out in this way, the hunting occurs.

FIG. 5B is an illustration of a case in which the "change rate limitation" processing according to the first embodiment is carried out after the "upper limit limitation" processing is carried out.

In FIG. 5B, first, in the period A, the target pre/post compressor pressure ratio (1) increases as a result of the acceleration request as in FIG. 5A, the actual pre/post compressor pressure ratio (2) follows the target pre/post compressor pressure ratio (1) to increase, and the compressor passage flow rate (3) simultaneously increases.

In the period B, as a result of the increase in the compressor passage flow rate (3), the turbine-limit-time pre/post compressor pressure ratio (4) decreases. Then, subsequently to the time point t1, in a period in which the relationship of "(target pre/post compressor pressure ratio (1))>(turbine-limit-time pre/post compressor pressure ratio (4))" holds true, the "upper limit limitation" processing is carried out, and the upper limit of the target pre/post compressor pressure ratio (1) is limited by the turbine-limit-time pre/post compressor pressure ratio (4). The operation up to this point is the same as that of FIG. 5A.

In FIG. 5B, processing after the start of the execution of the "upper limit limitation" processing is different from that of FIG. 5A. Specifically, in FIG. 5B, after the "upper limit limitation" processing is started at the time point t1, the execution of the "change rate limitation" processing is started at a time point t3. In the "change rate limitation" processing, the change rate on the increase side of the target pre/post compressor pressure ratio (1) is limited by a change rate limit value set in advance. Moreover, the "change rate limitation" processing is continued for a change rate limitation period set in advance from the time point t3. The change rate limitation period is set to, for example, 2 seconds, and the change rate limit value is set to a value less than 1, for example, 0.9. However, those values are examples, and the change rate limitation period and the change rate limit value are not limited to those values, and may appropriately be set.

In this way, in FIG. 5B, subsequently to the time point t1, in the period B, in a period in which the relationship of "(target pre/post compressor pressure ratio (1))>(turbine-limit-time pre/post compressor pressure ratio (4))" holds true, the "upper limit limitation" processing of limiting the upper limit of the target pre/post compressor pressure ratio (1) by the turbine-limit-time pre/post compressor pressure ratio (4) is carried out. Moreover, as a result of the decrease in the target pre/post compressor pressure ratio (1) by the "upper limit limitation" processing, the compressor passage flow rate (3) decreases. As a result, the turbine-limit-time pre/post compressor pressure ratio (4) starts to increase, and the target pre/post compressor pressure ratio (1) also starts to increase accordingly. Therefore, in FIG. 5B, the "change rate limitation" processing is carried out in the change rate limitation period set in advance from the time point t3 to limit the change rate on the increase side of the target pre/post compressor pressure ratio (1) to the change rate limit value. As a result, the target pre/post compressor pressure ratio (1) increases gradually compared with that in FIG. 5A. In FIG. 5A, in the period B, the target pre/post compressor pressure ratio (1) matches the turbine-limit-time pre/post compressor pressure ratio (4), but, in FIG. 5B, the target pre/post compressor pressure ratio (1) gradually increases at a change rate of 0.9 times of the change rate of the turbine-limit-time pre/post compressor pressure ratio (4). As a result, as illustrated in FIG. 5B, the value of the compressor passage flow rate (3) is stabilized, and the fluctuation as illustrated in FIG. 5A no longer occurs. In FIG. 5A, the control hunting of the feedback control, which is the repetition of the periods B and C, occurs as a result of the fluctuation of the compressor passage flow rate (3). In FIG. 5B, however, the compressor passage flow rate (3) does not fluctuate, and the occurrence of the control hunting can be suppressed. In this way, in FIG. 5B, the change rate on the increase side of the target pre/post compressor pressure ratio (1) is limited by the change rate limit value in the change rate limitation period from the time point t3. The time point t3 is a time point at which the target pre/post compressor pressure ratio (1) starts to increase.

The limitation on the change rate of the target pre/post compressor pressure ratio (1) is performed only on the increase side in this way, thereby enabling avoidance of adverse effect on responsiveness on a deceleration side, and surely enabling suppression of a turbine excessive rotation. Specifically, in a period from the time point t1 to the time point t3, the change rate of the target pre/post compressor pressure ratio (1) is on the decrease side, and the "change rate limitation" processing is thus not carried out. On the other hand, after the time point t3, the change rate of the target pre/post compressor pressure ratio (1) is on the increase side, and the "change rate limitation" processing is thus carried out. When the "change rate limitation" processing is control limited to the direction of suppressing the over rotation of the turbine in this way, the adverse effect on the responsiveness on the deceleration side can be avoided. In the above description, the start time point of the change rate limitation period is the time point t3, but the present invention is not limited to this case, and the start time point of the change rate limitation period may be the time point t1.

FIG. 5C is a timing chart for illustrating an example of the operation of a modification example of the first embodiment. FIG. 5C is a timing chart for illustrating a case in which, in addition to the "upper limit limitation" processing and the "change rate limitation" processing, the "correction toward decrease side" processing is carried out. In the "correction toward decrease side" processing, the target pre/post compressor pressure ratio (1) is corrected toward the decrease side when the actual pre/post compressor pressure ratio (2) is more than the turbine-limit-time pre/post compressor pressure ratio (4), in correspondence to the excessive pressure ratio amount.

As described before, in FIG. 5C, the dotted line represents the pre-upper-limit-limitation target pre/post compressor pressure ratio (5), and the broken line represents a decrease-side correction pre/post compressor pressure ratio (6).

The pre-upper-limit-limitation target pre/post compressor pressure ratio (5) is the value of the target pre/post compressor pressure ratio (1) before the start of the "upper limit limitation" processing at the time point t1.

Moreover, the decrease-side correction pre/post compressor pressure ratio (6) is a value acquired by carrying out the "correction toward decrease side" for the pre-upper-limit-limitation target pre/post compressor pressure ratio (5). In FIG. 5C, calculation of the decrease-side correction pre/post compressor pressure ratio (6) is started from the time point t2 at which the actual pre/post compressor pressure ratio (2) exceeds the turbine-limit-time pre/post compressor pressure ratio (4). Then, the upper limit of the target pre/post compressor pressure ratio (1) is limited by the decrease-side correction pre/post compressor pressure ratio (6) from a time point t2' at which the value of the decrease-side correction pre/post compressor pressure ratio (6) falls below the turbine-limit-time pre/post compressor pressure ratio (4).

The decrease-side correction pre/post compressor pressure ratio (6) is defined by the following expression. In other words, the decrease-side correction pre/post compressor pressure ratio (6) is a value acquired by correcting the pre-upper-limit-limitation target pre/post compressor pressure ratio (5) toward the decrease side by a difference between the actual pre/post compressor pressure ratio (2) and the turbine-limit-time pre/post compressor pressure ratio (4).

(decrease-side correction pre/post compressor pressure ratio(6))=(5)−((2)−(4))

When the actual pre/post compressor pressure ratio (2) is less than the turbine-limit-time pre/post compressor pressure ratio (4), the pre-upper-limit-limitation target pre/post compressor pressure ratio (5) is set as the decrease-side correction pre/post compressor pressure ratio (6) as expressed by the following expression.

(decrease-side correction pre/post compressor pressure ratio (6))=(5)

Moreover, in FIG. 5C, the target pre/post compressor pressure ratio (1) whose upper limit is limited is defined as follows.

(target pre/post compressor pressure ratio (1))=MIN ((4), (6))

In this expression, MIN(A, B) means a selection of smaller one of A and B. Thus, the target pre/post compressor pressure ratio (1) is a value of smaller one of the "turbine-limit-time pre/post compressor pressure ratio (4)" and the "decrease-side correction pre/post compressor pressure ratio (6)". A description is now given of FIG. 5C.

In FIG. 5C, first, in the period A, the target pre/post compressor pressure ratio (1) increases as a result of the acceleration request as in FIG. 5A and FIG. 5B, the actual pre/post compressor pressure ratio (2) follows the target pre/post compressor pressure ratio (1) to increase, and the compressor passage flow rate (3) simultaneously increases.

In the period B, as a result of the increase in the compressor passage flow rate (3), the turbine-limit-time pre/post compressor pressure ratio (4) decreases. Then, in a period in which the relationship of "(target pre/post compressor pressure ratio (1))>(turbine-limit-time pre/post compressor pressure ratio (4))" holds true, namely, a period from the time point t1 to the time point t2', the "upper limit limitation" processing of limiting the upper limit of the target pre/post compressor pressure ratio (1) by the turbine-limit-time pre/post compressor pressure ratio (4) is carried out. The operation up to this point is the same as those of FIG. 5A and FIG. 5B.

In FIG. 5C, however, operation after the "upper limit limitation" processing is carried out is different from those of FIG. 5A and FIG. 5B. Specifically, in FIG. 5C, after the "upper limit limitation" is started at the time point t1, the "correction toward decrease side" processing is started at the time point t2, and the calculation of the decrease-side correction pre/post compressor pressure ratio (6) is started. The time point t2 is a time point at which the actual pre/post compressor pressure ratio (2) exceeds the turbine-limit-time pre/post compressor pressure ratio (4).

On this occasion, the upper limit of the target pre/post compressor pressure ratio (1) is limited by the decrease-side correction pre/post compressor pressure ratio (6) in place of the turbine-limit-time pre/post compressor pressure ratio (4) from the time point t2' at which the decrease-side correction pre/post compressor pressure ratio (6) falls below the turbine-limit-time pre/post compressor pressure ratio (4). Thus, after the time point t2' of FIG. 5C, the upper limit of the target pre/post compressor pressure ratio (1) is limited by the decrease-side correction pre/post compressor pressure ratio (6). As a result, the increase amount of the actual pre/post compressor pressure ratio (2) caused by an overshoot can be decreased, and the over rotation of the turbine can thus be suppressed more.

In the period C, as in FIG. 5B, the "change rate limitation" processing is carried out. Specifically, as a result of the decrease in the target pre/post compressor pressure ratio (1) by the "upper limit limitation" processing and the "correction toward decrease side" processing, the compressor passage flow rate (3) decreases. As a result, the turbine-limit-time pre/post compressor pressure ratio (4) and the decrease-side correction pre/post compressor pressure ratio (6) increase. On this occasion, in FIG. 5C, as in FIG. 5B, the "change rate limitation" processing is carried out after the time point t3. In other words, the change rate on the increase side of the target pre/post compressor pressure ratio (1) is limited by the change rate limit value set in advance in the change rate limitation period set in advance. As a result, the control hunting of the repetition of the periods B and C of FIG. 5A caused by the fluctuation of the compressor passage flow rate (3) can be suppressed. The change rate limit value is only required to be set to, for example, 0.9, and the change rate limitation period is only required to be set to, for example, 2 seconds. Moreover, as in FIG. 5B, the time point t3 is the time point at which the target pre/post compressor pressure ratio (1) starts to increase.

The example of the acceleration transient operation is illustrated in FIG. 5C, but the control hunting can similarly be suppressed when the target pre/post compressor pressure ratio (1) or the actual pre/post compressor pressure ratio (2) exceeds the turbine-limit-time pre/post compressor pressure ratio (4) in a steady state operation.

FIG. 5D is a timing chart for illustrating an example of the operation of a further modification example of the first embodiment. FIG. 5D is a timing chart for illustrating a case in which "change rate limitation release" processing is carried out in addition to the "upper limit limitation" processing, the "change rate limitation" processing, and the "correction toward decrease side" processing. FIG. 5D is a timing chart for illustrating a case in which the "change rate limitation" processing is carried out for the target pre/post compressor pressure ratio (1) after acceleration, deceleration is once carried out, and the acceleration is carried out again during the execution period. FIG. 5D is a timing chart for illustrating a comparison between operation examples of a case in which the "change rate limitation release" processing is carried out and a case in which the "change rate limitation release" processing is not carried out in order to illustrate an effect of the "change rate limitation release" processing. The case in which the "change rate limitation release" processing is not carried out is indicated by (1a), (2a), and (3a), and the case in which the "change rate limitation release" processing is carried out is indicated by (1b), (2b), and (3b).

In FIG. 5D, first, in the period A, the target pre/post compressor pressure ratio (1) increases as a result of the acceleration request as in FIG. 5C, the actual pre/post compressor pressure ratio (2) follows the target pre/post compressor pressure ratio (1) to increase, and the compressor passage flow rate (3) simultaneously increases. Moreover, as a result of the increase in the compressor passage flow rate (3), the turbine-limit-time pre/post compressor pressure ratio (4) decreases. Then, in a period in which the relationship of "(target pre/post compressor pressure ratio (1))>(turbine-limit-time pre/post compressor pressure ratio (4))" holds true, the upper limit of the target pre/post compressor pressure ratio (1) is limited by the turbine-limit-time pre/post compressor pressure ratio (4) through the "upper limit limitation". On this occasion, when the actual pre/post compressor pressure ratio (2) exceeds the turbine-limit-time pre/post compressor pressure ratio (4), the "correction toward decrease side" processing is carried out to decrease the target pre/post compressor pressure ratio (1) by the excessive pressure ratio amount from a time point of the excess. Moreover, as a result of the decrease in the target pre/post compressor pressure ratio (1), the compressor passage flow rate (3) decreases, and the turbine-limit-time pre/post compressor pressure ratio (4) and the decrease-side correction pre/post compressor pressure ratio (6) increase. However, the "change rate limitation" processing of limiting the change rate on the increase side of the target pre/post compressor pressure ratio (1) to the change rate limit value is carried out during the change rate limitation period set in advance. The operation up to this point is the same as that of FIG. 5C.

The target pre/post compressor pressure ratio (1) decreases to 1.0 as a result of a deceleration request from the driver of the vehicle at a time point t4 in the period B, and the actual pre/post compressor pressure ratio (2) and the compressor passage flow rate (3) decrease accordingly.

The acceleration occurs again while the "change rate limitation" processing is being carried out for the target pre/post compressor pressure ratio (1) in the period C. As a result of this reacceleration request, the target pre/post compressor pressure ratio (1) increases again.

The case in which the "change rate limitation release" processing is carried out on this occasion is indicated by (1b), (2b), and (3b) of FIG. 5D, and the case in which the "change rate limitation release" processing is not carried out is indicated by (1a), (2a), and (3a) of FIG. 5D. (1a) and (1b) each indicate the target pre/post compressor pressure ratio (1), (2a) and (2b) each indicate the actual pre/post compressor pressure ratio (2), and (3a) and (3b) each indicate the compressor passage flow rate (3). The "change rate limitation release" processing is processing of releasing the "change rate limitation" processing even in the change rate limitation period when the pre-upper-limit-limitation target pre/post compressor pressure ratio (5) changes toward the decrease side while the "change rate limitation" processing is being carried out for the target pre/post compressor pressure ratio (1).

When the "change rate limitation release" processing is not carried out, the "change rate limitation" processing for the target pre/post compressor pressure ratio (1) is active from beginning of a rise of the target pre/post compressor pressure ratio (1) under a state in which the actual pre/post compressor pressure ratio (2) is decreased in the period B, and increases in the target pre/post compressor pressure ratio (1) and the actual pre/post compressor pressure ratio (2) are thus slow as indicated by (1a) and (2a) of FIG. 5D. As a result, there arises such a problem that an acceleration property during the reacceleration degrades.

In contrast, when the "change rate limitation release" processing is carried out, the "change rate limitation release" is carried out when the pre-upper-limit-limitation target pre/post compressor pressure ratio (5) changes toward the decrease side in the period B even during the execution of the "change rate limitation" processing for the target pre/post compressor pressure ratio (1). The "change rate limitation" processing is thus not activated on the rise of the target pre/post compressor pressure ratio (1) in the period C, and the delay in the rise of the actual pre/post compressor pressure ratio (2) does not occur as indicated by (1b) and (2b) of FIG. 5D. As a result, the problem that the acceleration property during the reacceleration degrades can be avoided.

As a result, in FIG. 5D, when the target pre/post compressor pressure ratio (1) exceeds the turbine-limit-time pre/post compressor pressure ratio (4), the "upper limit limitation" processing is carried out so that the target pre/post compressor pressure ratio (1) is limited by the turbine-limit-time pre/post compressor pressure ratio (4) or the decrease-side correction pre/post compressor pressure ratio (6). Moreover, after the "upper limit limitation" processing is carried out, the "change rate limitation" processing is carried out in the change rate limitation period set in advance from the time point at which the target pre/post compressor pressure ratio (1) starts to increase to limit the change rate of the target pre/post compressor pressure ratio (1) to the change rate limit value. As a result, the number of revolutions of the turbine can be suppressed so as not to exceed the limit revolution number. Further, the fluctuation of the target pre/post compressor pressure ratio (1) caused by the fluctuation of the compressor passage flow rate (3), and the occurrence of the hunting of the pre/post compressor pressure ratio control and the hunting of the wastegate valve opening control resulting from the fluctuation of the target pre/post compressor pressure ratio (1) can be suppressed. Moreover, in the case where the pre-upper-limit-limitation target pre/post compressor pressure ratio (5) changes toward the decrease side when the deceleration is once carried out, the "change rate limitation release" processing of releasing the limitation on the change rate for the target pre/post compressor pressure ratio (1) is carried out even during the execution of the "change rate limitation" processing. Consequently, the degradation of the acceleration property, which is caused by the delay in the rise of the target pre/post compressor pressure ratio (1) upon the reacceleration, can be avoided.

Referring to the flowchart of FIGS. 7A and 7B, a description is now given of an operation of the control device for an internal combustion engine according to the first embodiment of the present invention. FIGS. 7A and 7B are the flowchart for illustrating an operation of the target pre/post compressor pressure ratio calculation part 126 according to the first embodiment of the present invention.

In FIGS. 7A and 7B, in Step S101, the target compressor downstream pressure is first acquired by correcting the target throttle upstream pressure by the pressure decrease before and after the intercooler based on the target throttle upstream pressure P2t calculated by the target throttle upstream pressure calculation part 120. The target pre/post compressor pressure ratio (1) is calculated by dividing the acquired target compressor downstream pressure by the compressor upstream pressure, and the operation proceeds to Step S102.

In Step S102, the target pre/post compressor pressure ratio (1) calculated in Step S101 is set as the pre-upper-limit-limitation target pre/post compressor pressure ratio (5), and the operation proceeds to Step S103.

In Step S103, the actual pre/post compressor pressure ratio (2) and the turbine-limit-time pre/post compressor pressure ratio (4) calculated by the turbine-limit-time pre/post compressor pressure ratio calculation part 122 are compared with each other, and when a relationship of "(actual pre/post compressor pressure ratio (2))>(turbine-limit-time pre/post compressor pressure ratio (4))" holds true, the operation proceeds to Step S104. When the relationship does not hold true, the operation proceeds to Step S107.

In Step S104, a difference ((2)−(4)) between the actual pre/post compressor pressure ratio (2) and the turbine-limit-time pre/post compressor pressure ratio (4) is calculated as the excessive pressure, and the operation proceeds to Step S105.

In Step S105, the decrease-side correction pre/post compressor pressure ratio (6) is acquired by subtracting the excessive pressure calculated in Step S104 from the pre-upper-limit-limitation target pre/post compressor pressure ratio (5). Then, the acquired decrease-side correction pre/post compressor pressure ratio (6) is set as a target pre/post compressor pressure ratio 1, and the operation proceeds to Step S106.

In Step S106, in order to maintain the change rate limitation on the target pre/post compressor pressure ratio (1) in the change rate limitation period set in advance, a period X (sec) representing the time length of the change rate limitation period is set to a determination timer T1, and the operation proceeds to Step S107. The determination timer T1 is initialized to 0 (sec) when the power supply to the ECU 100 is turned on.

In Step S107, the turbine-limit-time pre/post compressor pressure ratio (4) calculated by the turbine-limit-time pre/post compressor pressure ratio calculation part 122 and the pre-upper-limit-limitation target pre/post compressor pressure ratio (5) set in Step S102 are compared with each other, and when a relationship of "(pre-upper-limit-limitation target pre/post compressor pressure ratio (5))>(turbine-limit-time pre/post compressor pressure ratio (4))" holds true, the operation proceeds to Step S108. When the relationship does not hold true, the operation proceeds to Step S110.

In Step S108, the turbine-limit-time pre/post compressor pressure ratio (4) is set as a target pre/post compressor pressure ratio 2, and the operation proceeds to Step S109.

In Step S109, in order to maintain the change rate limitation on the target pre/post compressor pressure ratio (1) in the change rate limitation period set in advance, the predetermined period X (sec) is set to a determination timer T2, and the operation proceeds to Step S110. The determination timer T2 is initialized to 0 (sec) when the power supply to the ECU 100 is turned on.

In Step S110, the target pre/post compressor pressure ratio 1 and the target pre/post compressor pressure ratio 2 are compared with each other, and when a relationship of "(target pre/post compressor pressure ratio 1)>(target pre/post compressor pressure ratio 2)" holds true, the operation proceeds to Step S111. When the relationship does not hold true, the operation proceeds to Step S112.

In Step S111, the target pre/post compressor pressure ratio 2 is set as the target compressor pre/post pressure ratio (1), and the operation proceeds to Step S113.

In Step S112, the target pre/post compressor pressure ratio 1 is set as the target pre/post compressor pressure ratio (1), and the operation proceeds to Step S113.

In Step S113, whether or not the determination timer T1 is 0 (sec) is determined, and when "T1=0" holds true, the operation proceeds to Step S117, and when "T1=0" does not hold true, the operation proceeds to Step S114.

In Step S114, in order to determine whether or not the target pre/post compressor pressure ratio (1) has changed toward the increase side, a target pre/post compressor pressure ratio (current value) and a target pre/post compressor pressure ratio (previous value) are compared with each other, and when a relationship of "(target pre/post compressor pressure ratio (current value))>(target pre/post compressor pressure ratio (previous value))" holds true, the operation proceeds to Step S115. When the relationship does not hold true, the operation proceeds to Step S116.

In Step S115, the value acquired by limiting the change rate toward the increase side of the target pre/post compressor pressure ratio (1) by the change rate limit value (for example, 0.9) set in advance is set to the target pre/post compressor pressure ratio (1), and the operation proceeds to Step S116.

In Step S116, a time width Y (sec) set in advance is subtracted from the value of the determination timer T1, and the operation proceeds to Step S121.

Meanwhile, in Step S117, whether or not the determination timer T2 is 0 (sec) is determined, and when "T2=0" holds true, the operation proceeds to Step S121, and when "T2=0" does not hold true, the operation proceeds to Step S118.

In Step S118, in order to determine whether or not the target pre/post compressor pressure ratio (1) has changed toward the increase side, the target pre/post compressor pressure ratio (current value) and the target pre/post compressor pressure ratio (previous value) are compared with each other, and when the relationship of "(target pre/post compressor pressure ratio (current value))>(target pre/post compressor pressure ratio (previous value))" holds true, the operation proceeds to Step S119. When the relationship does not hold true, the operation proceeds to Step S120.

In Step S119, the value acquired by limiting the change rate toward the increase side of the target pre/post compressor pressure ratio (1) by the change rate limit value (for example, 0.9) set in advance is set to the target pre/post compressor pressure ratio (1), and the operation proceeds to Step S120.

In Step S120, the time width Y (sec) set in advance is subtracted from the value of the determination timer T2, and the operation proceeds to Step S121.

In Step S121, in order to determine whether or not the pre-upper-limit-limitation target pre/post compressor pressure ratio set in Step S102 has changed toward the decrease side, the target pre/post compressor pressure ratio (previous value) and a pre-upper-limit-limitation target pre/post compressor pressure ratio (current value) are compared with each other, and when a relationship of "(target pre/post compressor pressure ratio (previous value))>(pre-upper-limit-limitation target pre/post compressor pressure ratio (current value))" holds true, the operation proceeds to Step S122. When the relationship does not hold true, the operation quits the processing.

In Step S122, the determination timer T1 is cleared to 0 (sec), and the operation proceeds to Step S123.

In Step S123, the determination timer T2 is cleared to 0 (sec), and the operation quits the processing.

With the control device for an internal combustion engine according to the first embodiment of the present invention described before, the number of revolutions of the turbine is suppressed so as not to exceed the limit revolution number by carrying out the "upper limit limitation" processing of limiting the target pre/post compressor pressure ratio (1) by the turbine-limit-time pre/post compressor pressure ratio (4) corresponding to the compressor passage flow rate acquired from the characteristic data of the compressor passage flow rate at the turbine limit revolution number and the pre/post compressor pressure ratio. Moreover, the change rate of the target pre/post compressor pressure ratio (1) is limited by the change rate limit value by carrying out the "change rate limitation" processing in the change rate limitation period after the execution of the "upper limit limitation" processing, and the fluctuation of the target pre/post compressor pressure ratio (1) caused by the change in the compressor passage flow rate (3), and the occurrence of the control hunting of the pre/post compressor pressure ratio and the hunting of the wastegate valve opening control resulting from the fluctuation of the target pre/post compressor pressure ratio (1) can thus be suppressed.

Moreover, in a case in which a deviation occurs between the target pre/post compressor pressure ratio (1) and the actual pre/post compressor pressure ratio (2) for some reason, a case in which the actual pre/post compressor pressure ratio (2) overshoots during transition, or the like, when the target pre/post compressor pressure ratio (1) is not more than the turbine-limit-time pre/post compressor pressure ratio (4), but the actual pre/post compressor pressure ratio (2) is more than the turbine-limit-time pre/post compressor pressure ratio (4), the target pre/post compressor pressure ratio (1) is corrected toward the decrease side by the excessive pressure ratio amount, to thereby provide the control toward the direction of decreasing the overshoot of the actual pre/post compressor pressure ratio (2). In this way, the number of revolutions of the turbine can be more surely suppressed so as not to exceed the limit revolution number.

Moreover, the "change rate limitation" processing for the target pre/post compressor pressure ratio (1) is carried out only for the change rate on the increase side, to thereby provide the control limited toward the direction of suppressing the over rotation of the turbine. In this way, the adverse effect on the responsiveness on the decrease side can be avoided.

Moreover, when the pre-upper-limit-limitation target pre/post compressor pressure ratio (5) changes toward the decrease side, the "change rate limitation release" of releasing the limitation on the change rate of the target pre/post compressor pressure ratio (1) is carried out, and the degradation of the acceleration property upon the reacceleration thus does not occur. For example, there is the following fear if the "change rate limitation release" processing is not carried out. After the acceleration, the "change rate limitation" processing for the target pre/post compressor pressure ratio (1) is activated. During the active period, when deceleration is carried out once, and then reacceleration is carried out, the rise of the target pre/post compressor pressure ratio (1) is delayed at the time of reacceleration due to the change rate limitation, resulting in the degradation in the acceleration property. In contrast, according to the first embodiment, the "change rate limitation release" processing is carried out, to thereby solve this problem.

According to the first embodiment, for example, when the pre-upper-limit-limitation target pre/post compressor pressure ratio (5) changes toward the decrease side when the deceleration is once carried out, the "change rate limitation" for the target pre/post compressor pressure ratio (1) is released even in the change rate limitation period. Consequently, the degradation of the acceleration property, which is caused by the delay in the rise of the target pre/post compressor pressure ratio (1) upon the reacceleration, can be avoided.

What is claimed is:

1. A control device for an internal combustion engine, which is configured to control an internal combustion engine provided for a vehicle, the vehicle comprising:
    a throttle valve, which is provided in an intake passage of the internal combustion engine;
    an air flow sensor, which is configured to detect an intake air flow rate in the intake passage of the internal combustion engine;
    a turbocharger, which includes a turbine provided in an exhaust passage of the internal combustion engine, and a compressor provided in the intake passage of the internal combustion engine and configured to rotate integrally with the turbine;
    an exhaust bypass passage, which is configured to allow an upstream side and a downstream side of the turbine to communicate to each other;
    a wastegate valve, which is provided in the exhaust bypass passage, and is configured to adjust a flow rate of exhaust gas of the internal combustion engine, which flows through the exhaust bypass passage;
    an actuator, which is configured to drive the wastegate valve to change an open position of the wastegate valve; and
    a throttle upstream pressure sensor, which is configured to detect an actual throttle upstream pressure having an actual value of a pressure of intake air on an upstream side of the throttle valve, which is compressed by the compressor, the control device for the internal combustion engine comprising a processor configured to:
    calculate a target throttle upstream pressure having a target value of the pressure of the intake air compressed by the compressor, based on an operation state of the internal combustion engine;
    calculate a target pre/post compressor pressure ratio based on the target throttle upstream pressure;
    carry out feedback control corresponding to a difference between the actual throttle upstream pressure detected by the throttle upstream pressure sensor and the target throttle upstream pressure, to thereby calculate a feedback correction amount for a target opening degree of the wastegate valve based on the target pre/post compressor pressure ratio;
    calculate, based on the feedback correction amount, the target opening degree of the wastegate valve required for matching the actual throttle upstream pressure with the target throttle upstream pressure to output the target opening degree to the actuator;
    calculate a compressor passage flow rate passing through the compressor based on the intake air flow rate detected by the air flow sensor;
    calculate a pressure on an upstream side of the compressor based on an atmospheric pressure;
    calculate a pressure on a downstream side of the compressor based on the actual throttle upstream pressure detected by the throttle upstream pressure sensor; and
    calculate, based on the compressor passage flow rate, a turbine-limit-time pre/post compressor pressure ratio being a pressure ratio of the pressure on the downstream side to the pressure on the upstream side of the compressor at a turbine limit revolution number;
    compare the target pre/post compressor pressure ratio and the turbine-limit-time pre/post compressor pressure ratio with each other, and to carry out upper limit limitation processing of limiting the target pre/post compressor pressure ratio by the turbine-limit-time pre/post compressor pressure ratio when the target pre/post compressor pressure ratio is more than the turbine-limit-time pre/post compressor pressure ratio; and
    carry out change rate limitation processing of limiting a change rate of the target pre/post compressor pressure ratio limited by the turbine-limit-time pre/post compressor pressure ratio so as to avoid exceeding a change rate limit value set in advance during a period set in advance after execution of the upper limit limitation processing starts.

2. The control device for an internal combustion engine according to claim 1, wherein a start timing of the change rate limitation processing includes an execution start timing of the upper limit limitation processing.

3. The control device for an internal combustion engine according to claim 2, wherein the change rate limitation processing is carried out only when the change rate changes toward an increase side.

4. The control device for an internal combustion engine according to claim 3, wherein the processor is further configured to:
    calculate an actual pre/post compressor pressure ratio being a ratio of the pressure on the downstream side of the compressor to the pressure on the upstream side of the compressor;
    compare the actual pre/post compressor pressure ratio and the turbine-limit-time pre/post compressor pressure ratio with each other, and calculate, when the actual pre/post compressor pressure ratio is more than the turbine-limit-time pre/post compressor pressure ratio, a decrease-side correction pre/post compressor pressure ratio for correcting the target pre/post compressor pressure ratio limited by the turbine-limit-time pre/post compressor pressure ratio toward a decrease side, based on an amount by which the actual pre/post compressor pressure ratio exceeds the turbine-limit-time pre/post compressor pressure ratio; and
    use, in the upper limit limitation processing, the decrease-side correction pre/post compressor pressure ratio in place of the turbine-limit-time pre/post compressor pressure ratio to limit the target pre/post compressor pressure ratio.

5. The control device for an internal combustion engine according to claim 3, wherein, when a value of the target pre/post compressor pressure ratio, which is calculated before the execution of the upper limit limitation processing, changes toward a decrease side due to a deceleration request issued by a driver of the vehicle during the period during which the change rate is limited, the processor is further configured to release the limitation on the change rate even before the period ends.

6. The control device for an internal combustion engine according to claim 2, wherein the process is further configured to:

calculate an actual pre/post compressor pressure ratio being a ratio of the pressure on the downstream side of the compressor to the pressure on the upstream side of the compressor;

compare the actual pre/post compressor pressure ratio and the turbine-limit-time pre/post compressor pressure ratio with each other, and calculate, when the actual pre/post compressor pressure ratio is more than the turbine-limit-time pre/post compressor pressure ratio, a decrease-side correction pre/post compressor pressure ratio for correcting the target pre/post compressor pressure ratio limited by the turbine-limit-time pre/post compressor pressure ratio toward a decrease side, based on an amount by which the actual pre/post compressor pressure ratio exceeds the turbine-limit-time pre/post compressor pressure ratio; and use, in the upper limit limitation processing, the decrease-side correction pre/post compressor pressure ratio in place of the turbine-limit-time pre/post compressor pressure ratio to limit the target pre/post compressor pressure ratio.

7. The control device for an internal combustion engine according to claim 6, wherein, when a value of the target pre/post compressor pressure ratio, which is calculated before the execution of the upper limit limitation processing, changes toward a decrease side due to a deceleration request issued by a driver of the vehicle during the period during which the change rate is limited, the processor is further configured to release the limitation on the change rate even before the period ends.

8. The control device for an internal combustion engine according to claim 2, wherein, when a value of the target pre/post compressor pressure ratio, which is calculated before the execution of the upper limit limitation processing, changes toward a decrease side due to a deceleration request issued by a driver of the vehicle during the period during which the change rate is limited, the processor is further configured to release the limitation on the change rate even before the period ends.

9. The control device for an internal combustion engine according to claim 1, wherein a start timing of the change rate limitation processing includes a timing at which the target pre/post compressor pressure ratio changes toward an increase side after the execution of the upper limit limitation processing starts.

10. The control device for an internal combustion engine according to claim 9, wherein the change rate limitation processing is carried out only when the change rate changes toward an increase side.

11. The control device for an internal combustion engine according to claim 10, wherein the processor is further configured to:

calculate an actual pre/post compressor pressure ratio being a ratio of the pressure on the downstream side of the compressor to the pressure on the upstream side of the compressor;

compare the actual pre/post compressor pressure ratio and the turbine-limit-time pre/post compressor pressure ratio with each other, and calculate, when the actual pre/post compressor pressure ratio is more than the turbine-limit-time pre/post compressor pressure ratio, a decrease-side correction pre/post compressor pressure ratio for correcting the target pre/post compressor pressure ratio limited by the turbine-limit-time pre/post compressor pressure ratio toward a decrease side, based on an amount by which the actual pre/post compressor pressure ratio exceeds the turbine-limit-time pre/post compressor pressure ratio; and use, in the upper limit limitation processing, the decrease-side correction pre/post compressor pressure ratio in place of the turbine-limit-time pre/post compressor pressure ratio to limit the target pre/post compressor pressure ratio.

12. The control device for an internal combustion engine according to claim 10, wherein, when a value of the target pre/post compressor pressure ratio, which is calculated before the execution of the upper limit limitation processing, changes toward a decrease side due to a deceleration request issued by a driver of the vehicle during the period during which the change rate is limited, the processor is further configured to release the limitation on the change rate even before the period ends.

13. The control device for an internal combustion engine according to claim 9, wherein the process is further configured to:

calculate an actual pre/post compressor pressure ratio being a ratio of the pressure on the downstream side of the compressor to the pressure on the upstream side of the compressor;

compare the actual pre/post compressor pressure ratio and the turbine-limit-time pre/post compressor pressure ratio with each other, and calculate, when the actual pre/post compressor pressure ratio is more than the turbine-limit-time pre/post compressor pressure ratio, a decrease-side correction pre/post compressor pressure ratio for correcting the target pre/post compressor pressure ratio limited by the turbine-limit-time pre/post compressor pressure ratio toward a decrease side, based on an amount by which the actual pre/post compressor pressure ratio exceeds the turbine-limit-time pre/post compressor pressure ratio; and use, in the upper limit limitation processing, the decrease-side correction pre/post compressor pressure ratio in place of the turbine-limit-time pre/post compressor pressure ratio to limit the target pre/post compressor pressure ratio.

14. The control device for an internal combustion engine according to claim 9, wherein, when a value of the target pre/post compressor pressure ratio, which is calculated before the execution of the upper limit limitation processing, changes toward a decrease side due to a deceleration request issued by a driver of the vehicle during the period during which the change rate is limited, the processor is further configured to release the limitation on the change rate even before the period ends.

15. The control device for an internal combustion engine according to claim 1, wherein the change rate limitation processing is carried out only when the change rate changes toward an increase side.

16. The control device for an internal combustion engine according to claim 15, wherein the processor is further configured to:

calculate an actual pre/post compressor pressure ratio being a ratio of the pressure on the downstream side of the compressor to the pressure on the upstream side of the compressor;

compare the actual pre/post compressor pressure ratio and the turbine-limit-time pre/post compressor pressure ratio with each other, and calculate, when the actual pre/post compressor pressure ratio is more than the turbine-limit-time pre/post compressor pressure ratio, a decrease-side correction pre/post compressor pressure ratio for correcting the target pre/post compressor pressure ratio limited by the turbine-limit-time pre/post compressor pressure ratio toward a decrease side, based on an amount by which the actual pre/post compressor pressure ratio exceeds the turbine-limit-time pre/post compressor pressure ratio; and use, in the upper limit limitation processing, the decrease-side correction pre/post compressor pressure ratio in place of the turbine-limit-time pre/post compressor pressure ratio to limit the target pre/post compressor pressure ratio.

17. The control device for an internal combustion engine according to claim 15, wherein, when a value of the target pre/post compressor pressure ratio, which is calculated before the execution of the upper limit limitation processing, changes toward a decrease side due to a deceleration request issued by a driver of the vehicle during the period during which the change rate is limited, the processor is further configured to release the limitation on the change rate even before the period ends.

18. The control device for an internal combustion engine according to claim 1, wherein the processor is further configured to:

calculate an actual pre/post compressor pressure ratio being a ratio of the pressure on the downstream side of the compressor to the pressure on the upstream side of the compressor;

compare the actual pre/post compressor pressure ratio and the turbine-limit-time pre/post compressor pressure ratio with each other, and calculate, when the actual pre/post compressor pressure ratio is more than the turbine-limit-time pre/post compressor pressure ratio, a decrease-side correction pre/post compressor pressure ratio for correcting the target pre/post compressor pressure ratio limited by the turbine-limit-time pre/post compressor pressure ratio toward a decrease side, based on an amount by which the actual pre/post compressor pressure ratio exceeds the turbine-limit-time pre/post compressor pressure ratio; and use, in the upper limit limitation processing, the decrease-side correction pre/post compressor pressure ratio in place of the turbine-limit-time pre/post compressor pressure ratio to limit the target pre/post compressor pressure ratio.

19. The control device for an internal combustion engine according to claim 18, wherein, when a value of the target pre/post compressor pressure ratio, which is calculated before the execution of the upper limit limitation processing, changes toward a decrease side due to a deceleration request issued by a driver of the vehicle during the period during which the change rate is limited, the processor is further configured to release the limitation on the change rate even before the period ends.

20. The control device for an internal combustion engine according to claim 1, wherein, when a value of the target pre/post compressor pressure ratio, which is calculated before the execution of the upper limit limitation processing, changes toward a decrease side due to a deceleration request issued by a driver of the vehicle during the period during which the change rate is limited, the processor is further configured to release the limitation on the change rate even before the period ends.

* * * * *